United States Patent
Worman et al.

(10) Patent No.: US 10,393,328 B2
(45) Date of Patent: Aug. 27, 2019

(54) PORTABLE LIGHT HAVING A PIVOTABLE LIGHT HEAD

(71) Applicant: Streamlight, Inc., Eagleville, PA (US)

(72) Inventors: William D. Worman, Phoenixville, PA (US); W. Ross McLennan, Perkasie, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 16/273,233

(22) Filed: Feb. 12, 2019

(65) Prior Publication Data

US 2019/0170307 A1   Jun. 6, 2019

Related U.S. Application Data

(62) Division of application No. 15/715,932, filed on Sep. 26, 2017, now Pat. No. 10,240,729.

(60) Provisional application No. 62/554,297, filed on Sep. 5, 2017.

(51) Int. Cl.
 *F21L 4/04* (2006.01)
 *F21L 4/08* (2006.01)
 *H02J 7/00* (2006.01)

(52) U.S. Cl.
 CPC .................... *F21L 4/08* (2013.01); *F21L 4/04* (2013.01); *H02J 7/0063* (2013.01)

(58) Field of Classification Search
 CPC ..... F21L 4/00; F21L 4/04; F21L 4/045; F21L 4/08; F21L 4/085; H02J 7/0063
 USPC .................................................. 362/187–208
 See application file for complete search history.

(56) References Cited

U.S. PATENT DOCUMENTS

| | | | |
|---|---|---|---|
| 3,944,805 A | 3/1976 | Moore | |
| 4,533,982 A | 8/1985 | Kozar | |
| 5,432,689 A | 7/1995 | Sharrah et al. | |
| 6,313,604 B1 | 11/2001 | Chen | |
| 6,913,370 B2 | 7/2005 | Ping | |
| 7,059,744 B2 | 6/2006 | Sharrah | |
| 7,481,551 B2 | 1/2009 | Sharrah | |
| 8,235,552 B1 | 8/2012 | Tsuge | |
| 8,400,109 B2 | 3/2013 | Wang | |
| 8,575,893 B2 | 11/2013 | Devaney | |
| 9,470,382 B1 | 10/2016 | Sharrah et al. | |
| 2008/0030977 A1 | 2/2008 | Bobbin | |
| 2008/0225518 A1 | 9/2008 | Devaney et al. | |
| 2009/0190332 A1 | 7/2009 | Sharrah | |
| 2012/0033415 A1 | 2/2012 | Sharrah et al. | |
| 2012/0062178 A1 | 3/2012 | Wang | |
| 2014/0197781 A1 | 7/2014 | Maglica | |
| 2015/0219292 A1 | 8/2015 | Ross | |

OTHER PUBLICATIONS

Streamlight, Inc., "C4 LED—615 Lumen Rechargeable LED Flood Lantern", Product Specifications, 2 pages, date prior to Sep. 26, 2017 filing date, www.streamlight.com.

(Continued)

*Primary Examiner* — Jason M Han
(74) *Attorney, Agent, or Firm* — Clement A. Berard, Esq.; Dann, Dorfman, Herrell & Skillman, PC

(57) ABSTRACT

A portable light includes a light head that is pivotable relative to a light body and that preferably has a detent provided by a cylindrical projection and a corresponding or complementary receptacle of the pivot joint. The light head may have a latch projection, wherein the light body has a latch ring that can engage the latch projection to retain the light head in a stowed position and that can be stowed.

28 Claims, 16 Drawing Sheets

(56) References Cited

OTHER PUBLICATIONS

Streamlight, Inc., "C4 LED—540 Lumen Rechargeable Spot Beam Lantern", Product Specifications, 2 pages, date prior to Sep. 26, 2017 filing date, www.streamlight.com.
Streamlight, Inc., "C4 LED—Rechargeable Firefighting LED Lantern", Product Specifications, 2 pages, date prior to Sep. 26, 2017 filing date, www.streamlight.com.
Streamlight, Inc., "C4 LED—ATEX Rated, Industrial and Fire Carry Lantern", Product Specifications, 2 pages, date prior to Sep. 26, 2017 filing date, www.streamlight.com.
Streamlight, Inc., "Vulcan LED—ATEX Rated Rechargeable Lantern", Data Sheet, 1 page, dated Apr. 2016, www.streamlight.com.
Streamlight, Inc., "Fire Vulcan—Rechargeable LED Lantern", Data Sheet, 1 page, dated Mar. 2016, www.streamlight.com.
Streamlight, Inc., "Fire Vulcan—LED Rechargeable Lantern", Data Sheet, 2 pages, dated Apr. 2017, www.streamlight.com.
International Searching Authority, "PCT—International Search Report & Written Opinion", PCT/US2018/046225, dated Oct. 26, 2018, 11 pages.

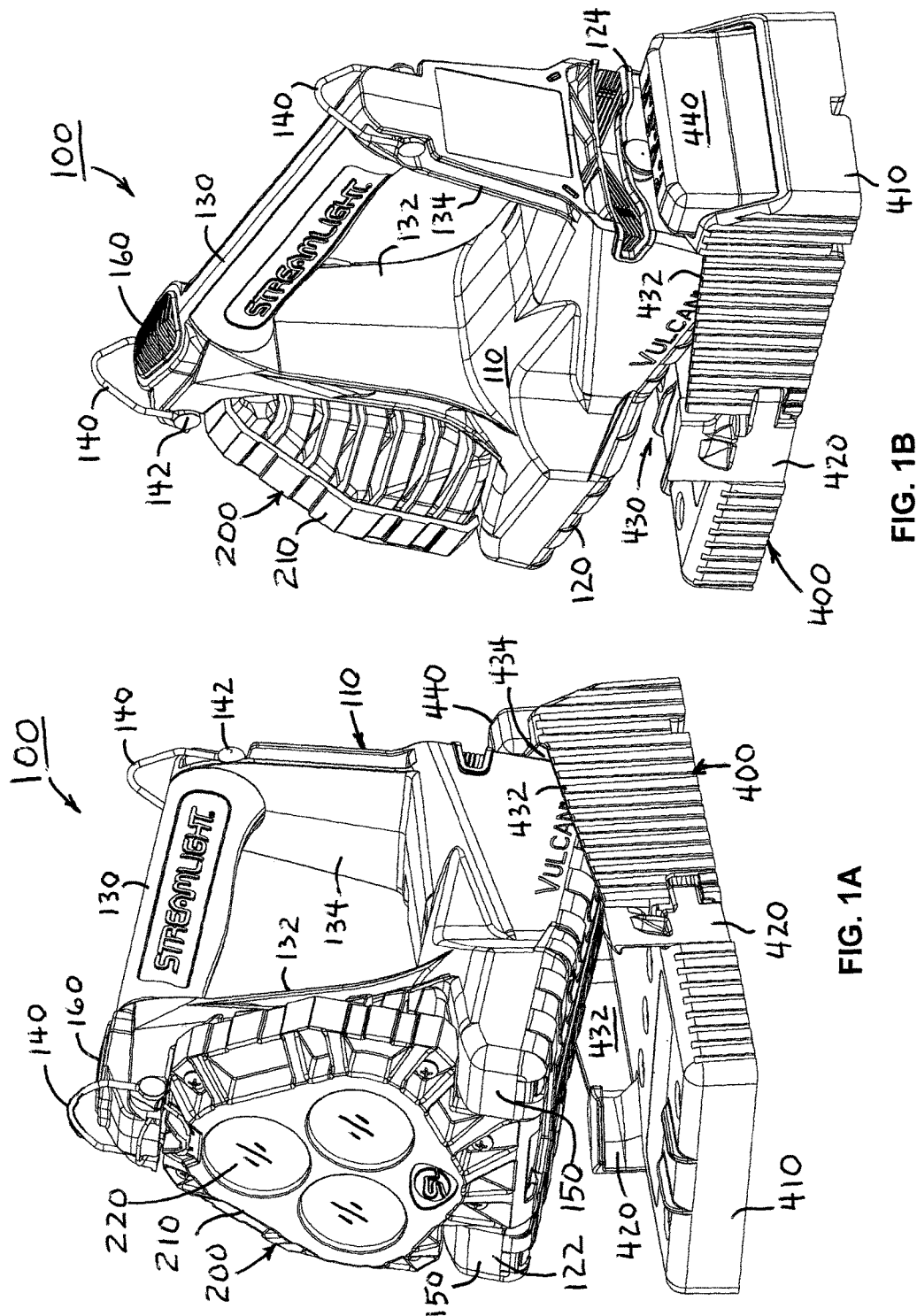

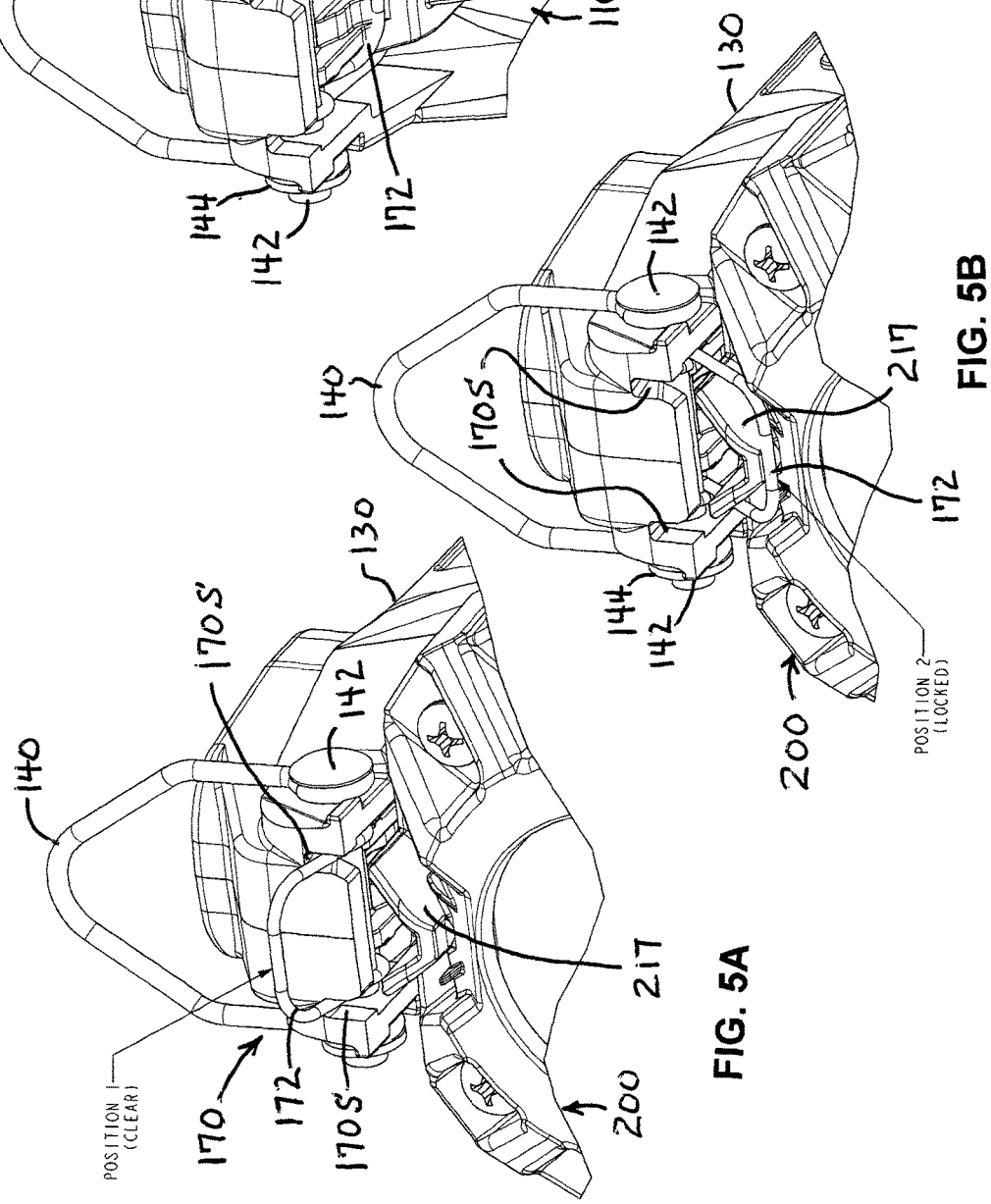

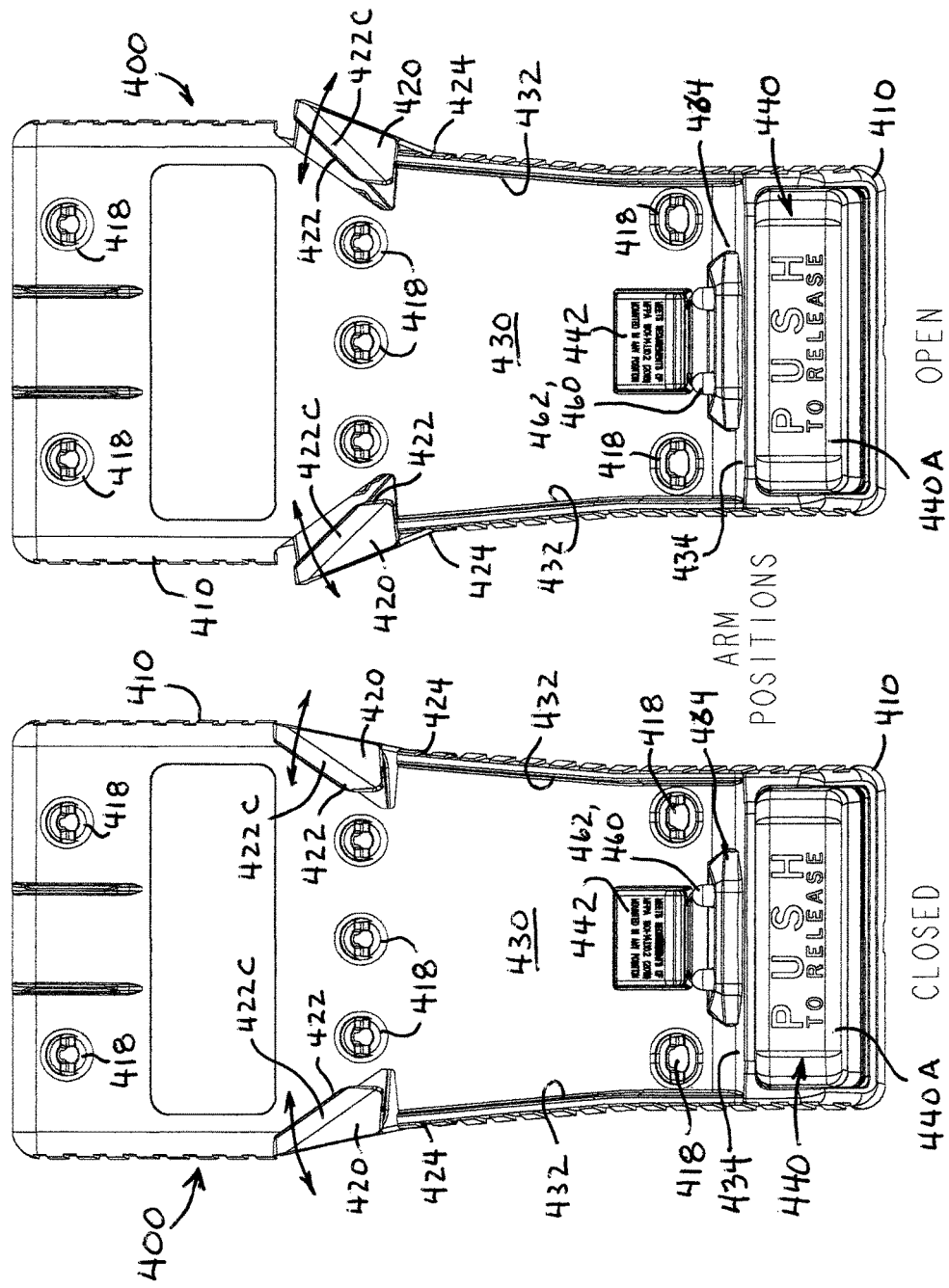

PORTABLE LIGHT HAVING A PIVOTABLE LIGHT HEAD

This Application is a division of U.S. patent application Ser. No. 15/715,932 entitled "PORTABLE LIGHT AND CHARGING DEVICE THEREFOR" which was filed on Sep. 26, 2017, which claims the benefit of U.S. Provisional Patent Application No. 62/554,297 entitled "PORTABLE LIGHT AND CHARGING DEVICE THEREFOR" which was filed on Sep. 5, 2017, each of which is hereby incorporated herein by reference in its entirety.

The present invention relates to a portable light, in particular, to a portable light having a pivotable light head.

Portable lights are employed in many fields and environments in which the ability of a light to meet a particular need is limited because the light is either in a fixed configuration or the light includes movable parts that are not movable to a desired position or positions. Many different approaches have been utilized, such a having the light source supported on a pivoted structure or at the end of a flexible and/or bendable stalk. Often, what is gained in position-ability of the light source may be counter balanced by reduced robustness and/or durability.

These issues can be more challenging in relation to larger and higher power lights, in particular those lights that may be employed under difficult and/or hazardous environments, such as may be experienced by fire fighters and other first responders.

It is also desirable that portable lights used by fire fighters and other first responders also be ready for use at a moment's notice, and so these lights typically include a rechargeable battery. A charger, or commonly a bank of chargers, may be mounted in a convenient location, such as on a wall at a fire station or other first responder facility, or on a wall or bulkhead or panel of a vehicle used by fire fighters and other first responders, where the rechargeable portable lights may be placed into the chargers for recharging following use, for maintaining a fully charged and ready state, and for being quickly and easily removed when needed.

Moreover, fire fighters and other first responders often are wearing specialized and/or protective clothing, including gloves, and so their portable lights should be easily placeable into and removable from the chargers in a manner that does not require precision placement and motions, which may be difficult to execute while wearing protective gear.

Applicant believes that the foregoing may be addressed by a portable light that has a pivotable light source that can be pivoted over a large range of angles relative to a body of the light.

Applicant also believes that a charger configured to receive the portable light when inserted therein over a range of angles and to release the portable light when it is removed therefrom over a range of angles would also address such needs.

Applicant believes there may be a need for a portable light and charger that together are configured to provide the foregoing features including movability of a light source over a range of angles and the insertion of the portable light into and its removal from the charger over a range of angles.

Accordingly, a portable light having a pivotable light head may comprise: a light body for receiving a source of electrical power; a light head pivotably mounted to the light body, wherein the light head includes a light source energizable for producing light; one of the light body and the light head having a pair of substantially coaxial and cylindrical projections extending therefrom; the other of the light body and the light head having a pair of substantially coaxial receptacles cooperating with the pair of substantially coaxial and cylindrical projections for providing a pivotable joint between the light head and the light body, wherein one or both of the cylindrical projections has a plurality of projections and/or recesses thereon for providing a detent for the pivoting of the light head relative to the light body, whereby the light head tends to remain in a detent position at certain pivot angles relative to the light body when manually moved to such positions; and a switch actuatable for coupling electrical power from the source of electrical power to the light source for energizing the light source.

Accordingly, a portable light may comprise: a light body having a handle and a base for receiving a source of electrical power; a light head including a light source energizable for producing light, the light head being pivotably mounted to the light body and having a projection; a switch actuatable for energizing the light source; and a latch ring mounted to the light body and configured to engage the projection of the light head, the latch ring having a first position whereat it does not engage the projection of the light head and a second position whereat it engages the projection of the light head when the light head is adjacent the light body.

Accordingly, a charger for a portable light may comprise: a charger housing having a receptacle configured to receive the portable light and having a charging contact configured to make electrical connection to the portable light when the portable light is disposed in the receptacle; a release latch moveably mounted to the charger housing and having a projection. The release latch has a first position in which the projection thereof extends into the receptacle for engaging the portable light, and has a second position in which the projection does not extend into the receptacle and does not engage the portable light, and a first biasing element to bias the release latch towards the first position. A pair of latch arms on the charger housing in opposing positions are moveable to extend into the receptacle and out of the receptacle to engage and not engage the portable light in the receptacle of the charging device. A second biasing element biases the latch arms towards each other to retain the portable light in the charging device.

Accordingly, a portable light and a charger for a portable light may comprise: a portable light including: a light body having a handle and a base for receiving a source of electrical power; a light head including a light source energizable for producing light, the light head being pivotably mounted to the light body and having a projection; a switch actuatable for energizing the light source; and a latch ring mounted to the light body and configured to engage the projection of the light head, the latch ring having a first position whereat it does not engage the projection of the light head and a second position whereat it engages the projection of the light head when the light head is adjacent the light body; and a charger including a charger housing having a receptacle configured to receive the portable light and having a charging contact configured to make electrical connection to the portable light when the portable light is disposed in the receptacle; a release latch moveably mounted to the charger housing and having a projection. The release latch has a first position in which the projection thereof extends into the receptacle for engaging the portable light, and has a second position in which the projection does not extend into the receptacle and does not engage the portable light, and a first biasing element to bias the release latch towards the first position. A pair of latch arms on the charger housing in opposing positions are moveable to extend into the receptacle and out of the receptacle to engage and not engage the portable light in the receptacle of the charging device. A second biasing element biases the latch arms towards each other to retain the portable light in the charging device.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIGS. 1A and 1B are perspective views of the example portable light partially disposed in the example charging device, as when being placed into and/or removed therefrom;

FIGS. 5A through 5C are perspective views of an example latch arrangement with the example head latch member in clear, locked and stowed positions, respectively;

FIGS. 8A and 8B are plan views of the charging device with latch arms thereof in retracted and extended positions, respectively;

Figure 1:
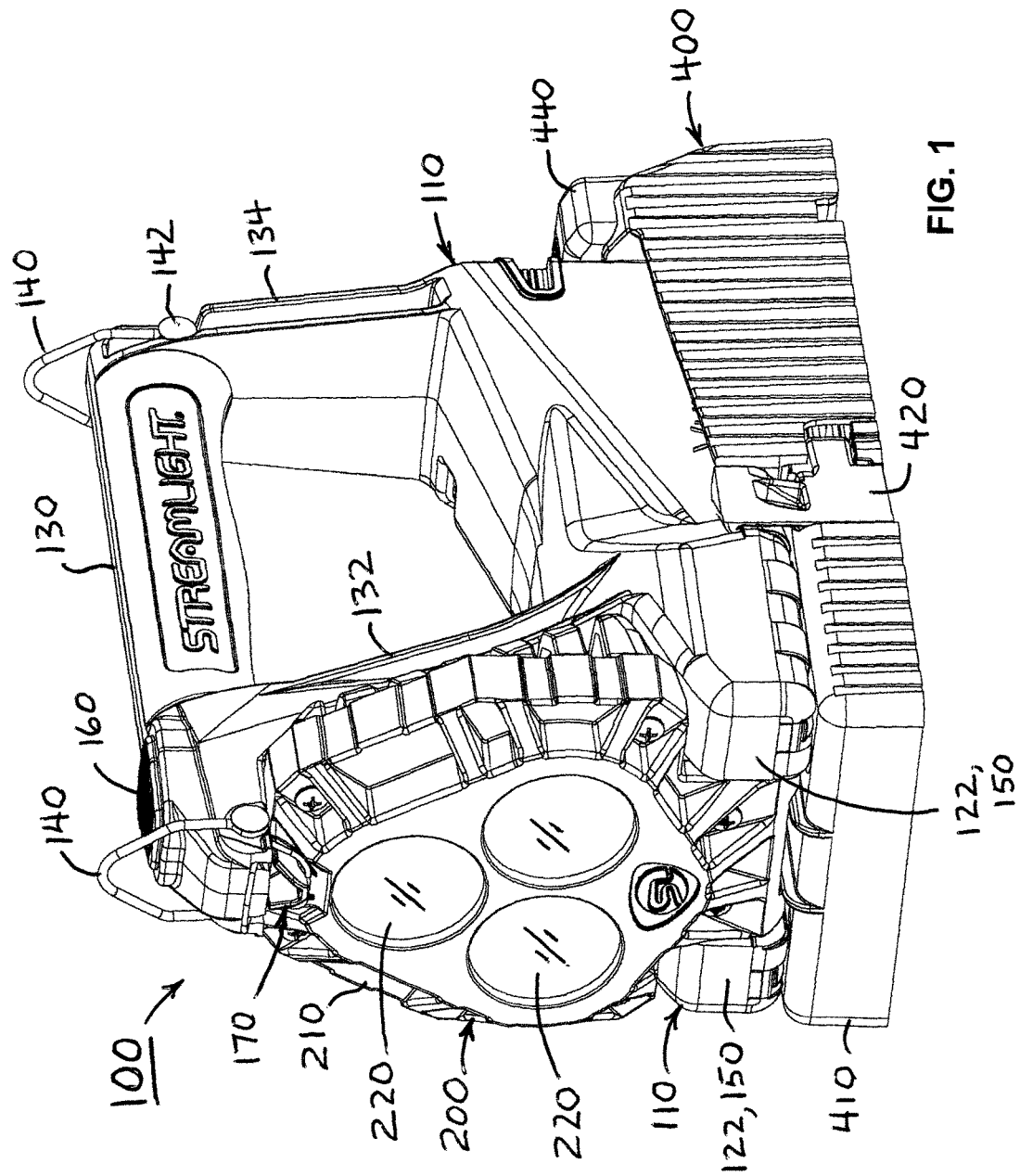
FIG. 1 is a perspective view of an example embodiment of a portable light disposed in an example embodiment of a charging device.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 2:
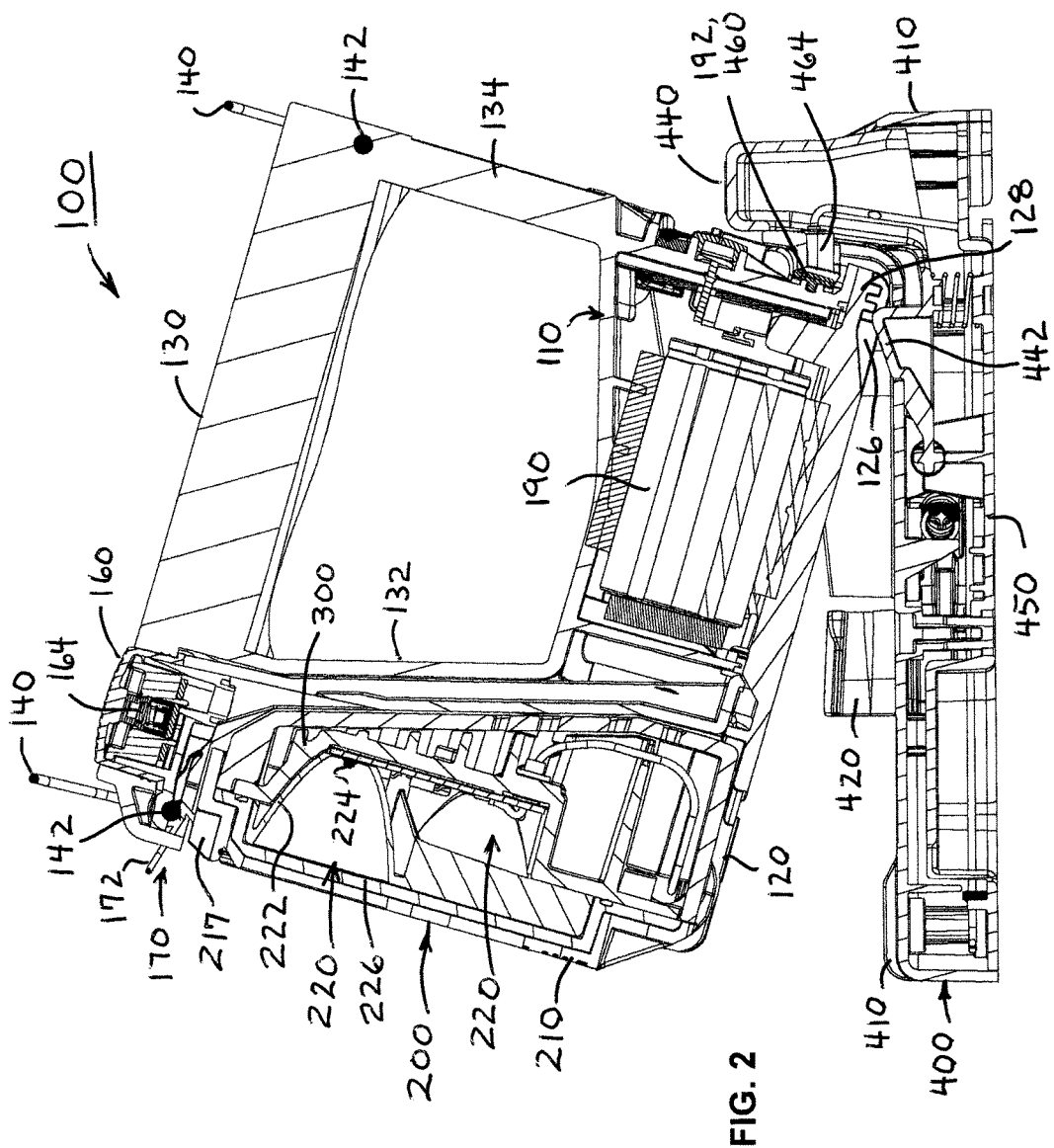
FIG. 2 is a side cross-sectional view of the example portable light and the example charging device substantially in the position of FIGS. 1A and 1B, and FIGS. 2A and 2B are enlarged portions of side cross-sectional views illustrating details relating to the positioning of the example light in the example charging device.
Figure 2A:
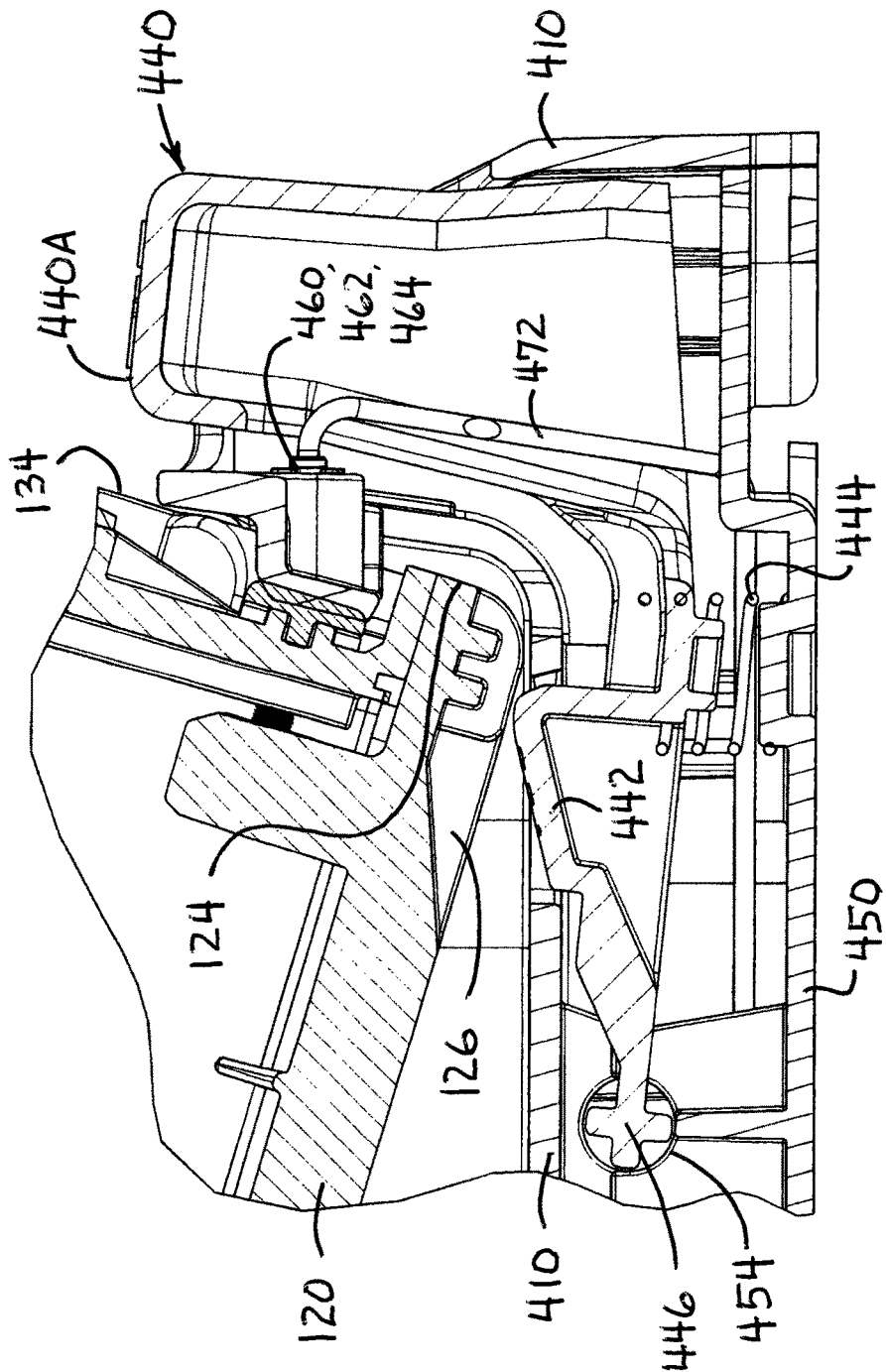
Figure 2B:
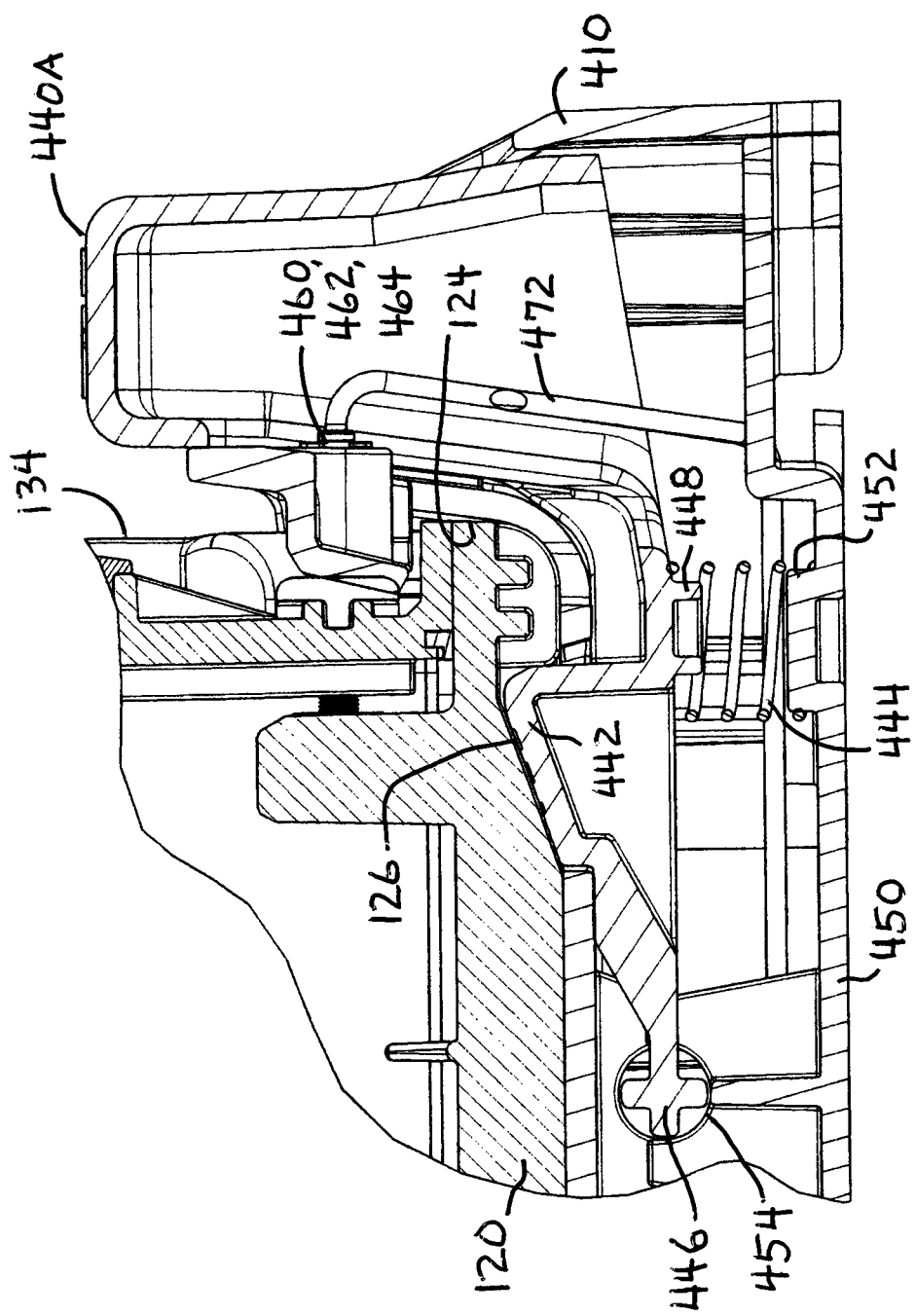

FIG. 1 is a perspective view of an example embodiment of a portable light 100 disposed in an example embodiment of a charging device 400, and FIGS. 1A and 1B are perspective views of the example portable light 100 partially disposed in the example charging device 400, as when being placed into and/or removed therefrom; and FIG. 2 is a side cross-sectional view of the example portable light 100 and the example charging device 400 substantially in the position of FIGS. 1A and 1B, and FIGS. 2A and 2B are enlarged portions of side cross-sectional views of FIGS. 1A, 1B and 2 illustrating details relating to the positioning of the example light 100 in the example charging device 400.

Light 100 includes a light housing 110 or body 110 having a base 120 having a forward end 122 and a rearward end or heel 124, a handle 130 supported on forward support 132 and rearward support 134, a light head 200 pivotably supported at the forward end 122 of base 120. Light 100 preferably includes one or more loops or rings 140, e.g., D-rings 140, supported on or near to handle 130, to which a strap or lanyard may be attached. Preferably, each of D-rings 140 is pivotably attached to handle 130 by a respective pin 142 that passes through rings 140R at the respective ends of D-rings 140 and through the housing 110 at or near to handle 130. Typically, pivot pin 144 has a head at one end and is swaged or peened or otherwise fastened at the other end so as to be retained in its position in or near handle 130 to retain D-ring 140 to light 100. Typically, a washer 144 may be provided at the swaged or peened end of pivot pin 142.

In a preferred embodiment, light head 200 includes a head housing 210 supporting a plurality of light sources 220, e.g., three light sources 220, aimed substantially in the same general direction to cooperate to provide a beam of light, e.g., a beam of substantial light intensity, in that general direction. Each light source 220 may include a light emitting diode (LED) light source 224 that is selectively energizable to produce light, e.g., responsive to actuation of switch actuator assembly 160, 164. Typically a source of electrical power 190, e.g., a battery 190, may be provided in the base 120 of light housing 110. Switch actuator assembly 160 controls an electrical switch in light housing 110 to selectively cause electrical power from power source 190 to be coupled to light sources 220, e.g., to LEDs 224 therein, thereby to energize light sources 220, 224, to produce light.

Each of light sources 220 preferably includes an optically reflective element 222 that forms the light emitted by the LED 224 into a light beam having a desired direction and beam width that passes through a substantially transparent lens 226 to be emanated from light head 200, e.g., in a direction substantially perpendicular to the face of head housing 210 that supports light sources 220. Reflective elements 222 may be, e.g., curved reflective surfaces 222 that reflect light from LEDs 224 or may be, e.g., internally reflective solid optical elements, e.g., totally internally reflective (TIR) optical elements 222, as may be desired.

Preferably housing 110 has two opposing spaced apart pivot supports 150 at the forward end 122 of base 120 between which light head 200 is pivotably supported and retained, i.e. in a recess 152 defined by the forwardly extending opposing pivot supports 122, 150. Light head 200 may be pivoted or rotated upward about an axis between pivot supports 122 to be in a position as illustrated in FIG. 1, which may be referred to as a stowed position, and may be pivoted or rotated away, or deployed, from that stowed position by up to about 180° or more. Preferably, a head latch 170, e.g., including a latch ring 172 is provided to retain light head 200 in its stowed position and to release light head 200 to be pivoted away from the stowed position.

A charging device 400 is preferably provided that is configured to receive portable light 100 therein for charging and/or recharging the power source of light 100, e.g., typically a power source 190 disposed in the base 120 thereof. It is preferred that portable light 100 and charging device 400 are configured so that light 100 may be placed into charging device 400 from a range of positions and angles as might be convenient for a user, rather than requiring a precise positioning and movement of light 100 in order to properly seat light 100 in charging device 400. Charging device 400 includes a charger housing 410 that is configured to have a receptacle 430 that is complementary to the shape of the base 120 of light 100 for receiving the base 120 therein and that includes one or more retaining elements that retain the base 120 of light 100 in charging device 400 in a position wherein respective electrical contacts of light 100 are in electrical contact with electrical contacts of charging device 400 so that charging current can flow from charging device 400 to light 100 for charging the electrical power source 190 thereof. Typically, a pair of charging contacts may be provided on the heel 124 of base 120 in positions complementary to the position of a pair of charging contacts on the end wall 434 of receptacle 430.

Typically the electrical contacts of light 100, e.g., a pair of contacts, are disposed at the heel 124 of base 120 thereof and the electrical contacts of charging device 400, e.g., a pair of contacts, are disposed at the closed end wall 434 of receptacle 430 thereof, e.g., in positions complementary to those of the electrical contacts of light 100 for coming into electrical contact when light 100 is substantially fully seated in receptacle 430 of charging device 400. Receptacle 430 of charging device housing 410 is defined by a pair of opposing side walls 432 and an adjoining end wall 434 that define a space that is slightly larger than the base 120 of light housing 110. Side walls 432 and end wall 434 define and surround a base surface of receptacle 430.

Charger housing 410 further includes a pair of opposing pivotable latch arms 420 disposed adjacent to the ends of side walls 432 that are distal the closed end wall 434. Latch arms 420 are pivotable outwardly from charger housing 410 so as to facilitate the placing of light housing 110 therein and the removing of light housing 110 therefrom, whereby light 100 may easily be placed into and removed from charging device 400. Preferably pivotable latch arms 420 are biased, e.g., by a spring or springs, to move toward charger housing 410, i.e. toward each other, thereby to engage the base 120 of light 100 for tending to retain light 100 in charging device 400. A pair of projections on opposing sides of base 120 are configured to be engaged by latch arms 420 when light 100 is substantially fully seated in receptacle 430 of charging device 400.

Because latch arms 420 are free to pivot simply by overcoming the biasing provided by the spring or springs thereof, light 100 may be easily "snapped" into charging device 400, e.g., by a user who is holding a light 100, e.g., by its handle 130. This "snap in" action is operative whether light 100 is moved toward charging device 400 at an angle as illustrated in FIGS. 1A and 1B and is then rotated so that base 120 is in receptacle 430 or whether light 100 is slid (moved laterally) into or out of receptacle 430 with the bottom of base 120 substantially parallel to the surface of charger housing 410 extending between side walls 432 thereof. As a result, light 100 may easily and conveniently be placed into charging device 400 with little concern for its orientation relative to charging device 400 (other than that the heel 124 of base 120 is towards end wall 434).

Preferably, light housing 110 has a rearward extension 128 near the bottom of the heel or rearward end 124 of base 120 that is configured to move into a space under contact support 464 which supports electrical contacts 460 in receptacle 430 of charging device 400. Support 464 extends from the rear wall 434 of receptacle 430 of charging device 400 to support electrical contacts 460 in a predetermined location relative to light 100 when light 100 is disposed in receptacle 430 of charging device 400.

With extension 128 under support 464, the rearward end 124 of light 100 is positioned so that the respective electrical contacts of light 100 and charging device 400 are properly aligned to make electrical contact, and the heel 124 of light 100 is retained in receptacle 430. That engagement of heel 128 and support 464 along with the two latch arms 420 provides three points of contact with housing 110 for retaining light 100 in charging device 400. Thus, light 100 can be hooked by support 464 and snapped over latch arms 420 for rapidly being placed into receptacle 430, i.e. in a "hook and snap" manner, also referred to as "snap-in."

Latch arms 420 engaging base 120 of light 100 cooperate with an edge of base 120 thereof to retain light 100 in the charging receptacle 430 of charging device 400. For example, the base 120 may be wider at or near its bottom surface so that the transition to a narrower portion thereof provides a pair of opposing shoulders which the ends of latch arms 420 engage for retaining light 100 in receptacle 430. Preferably latch arms 420 are biased towards each other thereby to move over such shoulders or other projections of base 120 to maintain positive engagement therewith.

Charging device 400 preferably includes a latch member 442 that engages a latching recess 126 in base 120 of light 100 when light 100 is substantially fully disposed in receptacle 430 of charging housing 410 thereby to retain light 100 thereon, e.g., to prevent its removal except a positive action be taken. Latch member 442 may be part of release actuator 440 or may be a separate part operatively coupled thereto.

Release actuator 440 is movable in base 410 and is coupled to latching member 442 such that when release actuator 440 is depressed, e.g., moved toward (into) base 410, latching member 442 moves away from and disengaging from base 120 of light 100, thereby to permit light 100 to be removed from charging device 400 simply by overcoming the retaining force of pivoting latch arms 420. Thus, light 100 may be "snapped out" of charging device 400 once actuator 440 is released and light 100 is slid slightly forward, in a somewhat similar manner to it being "snapped in" to charging device 400. Removal of light 100 may be by sliding it in a direction parallel to base housing 410, e.g., parallel to the bottom of receptacle 430, or by pulling it out of receptacle at an angle after being moved a short distance forward, e.g., substantially in any direction opposite to the directions in which it may be inserted into receptacle 430. This "snap in-snap out" feature can be particularly advantageous when it in necessary or desirable to quickly place light 100 into charging device 400 or to quickly remove it therefrom.

Figure 3A:
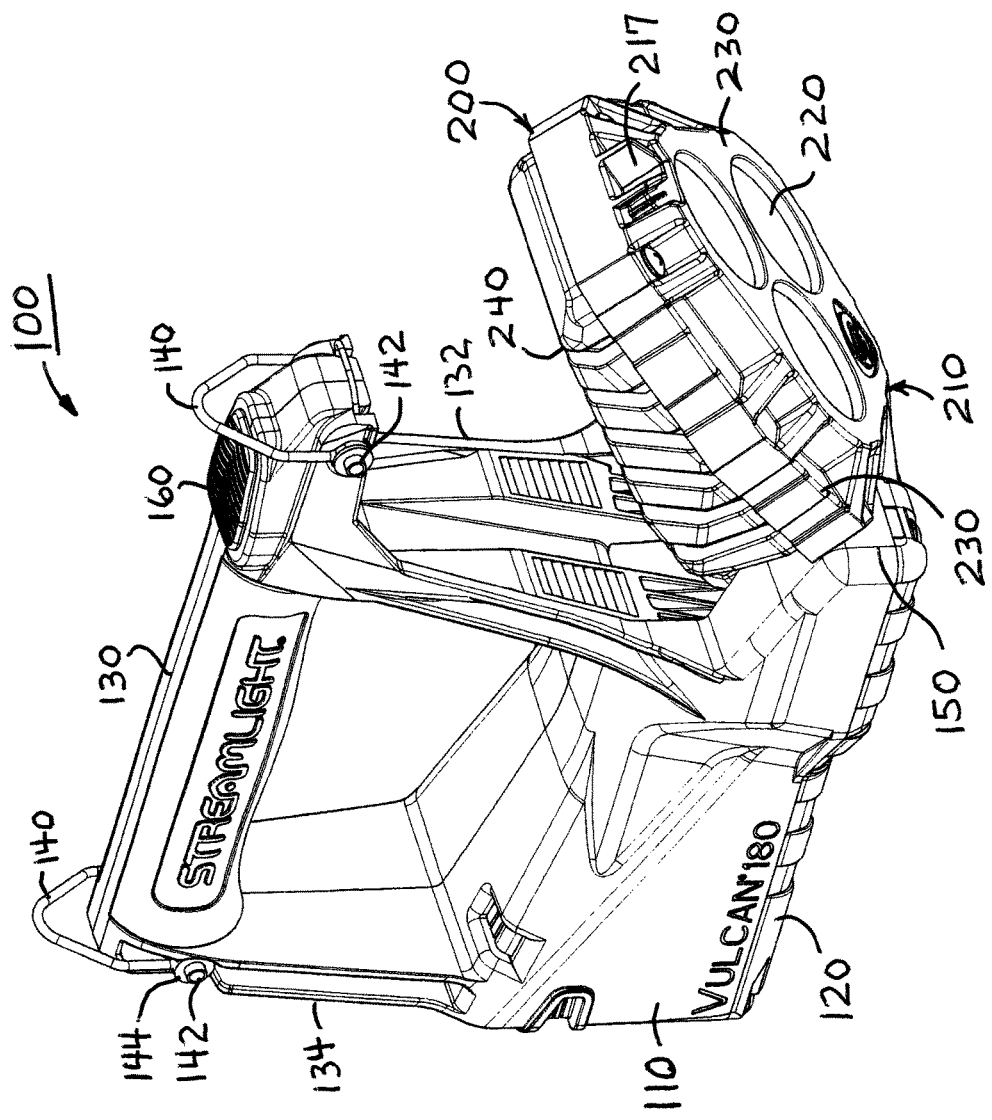
FIGS. 3A and 3B are front and rear perspective views, respectively, of the example portable light with an example embodiment of a light head thereof pivoted relative thereto.
Figure 3B:
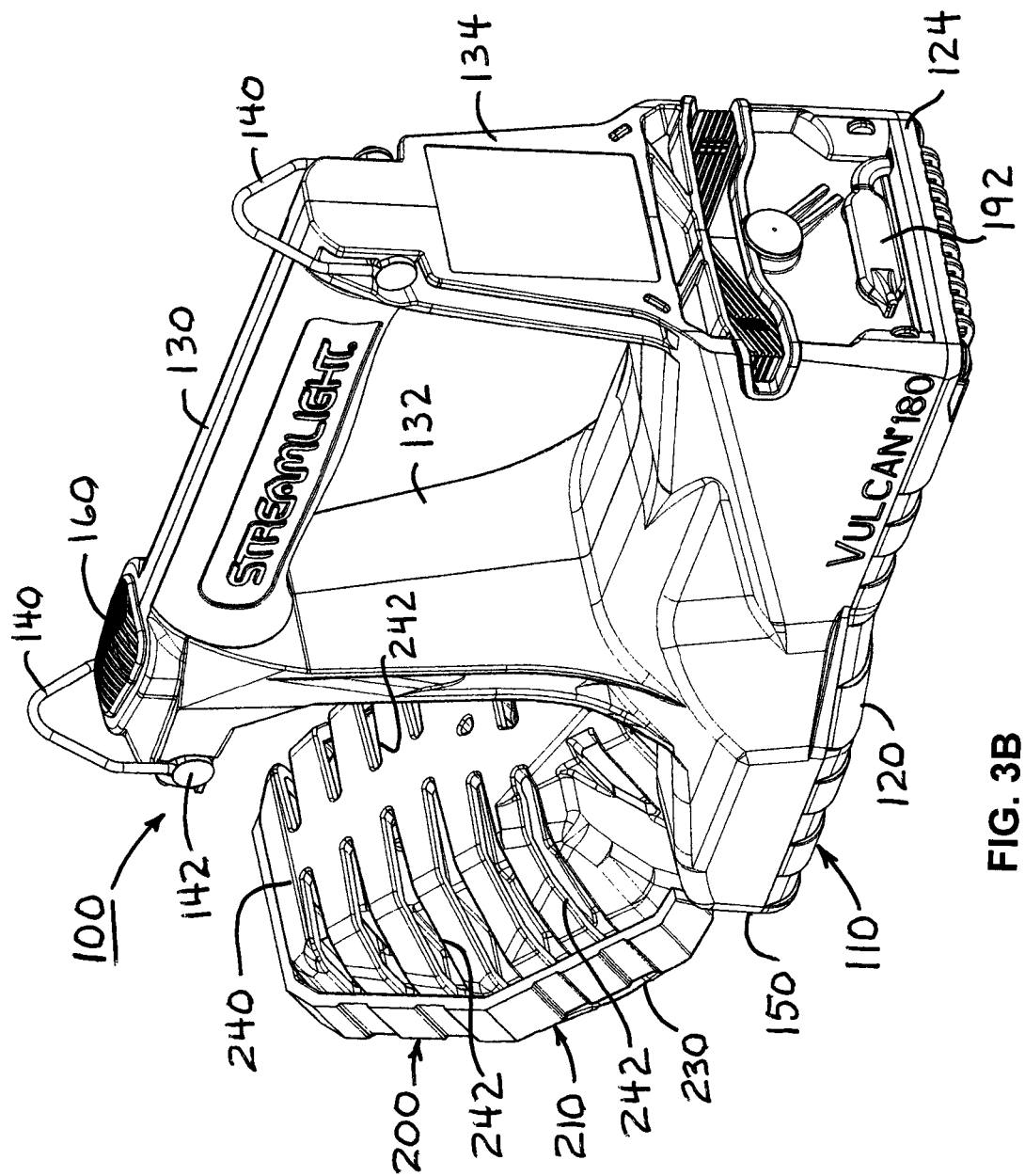
Figure 4A:
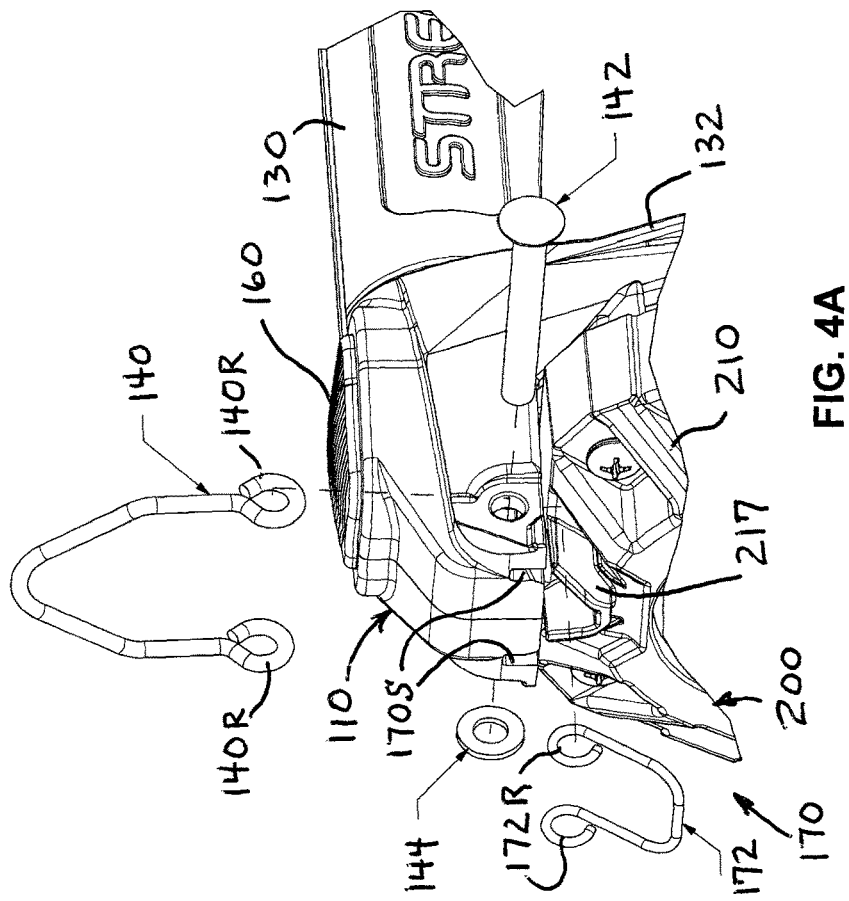
FIG. 4A is an enlarged exploded perspective view of an example D-ring and example head latch of the light head of FIG. 4.
Figure 4:
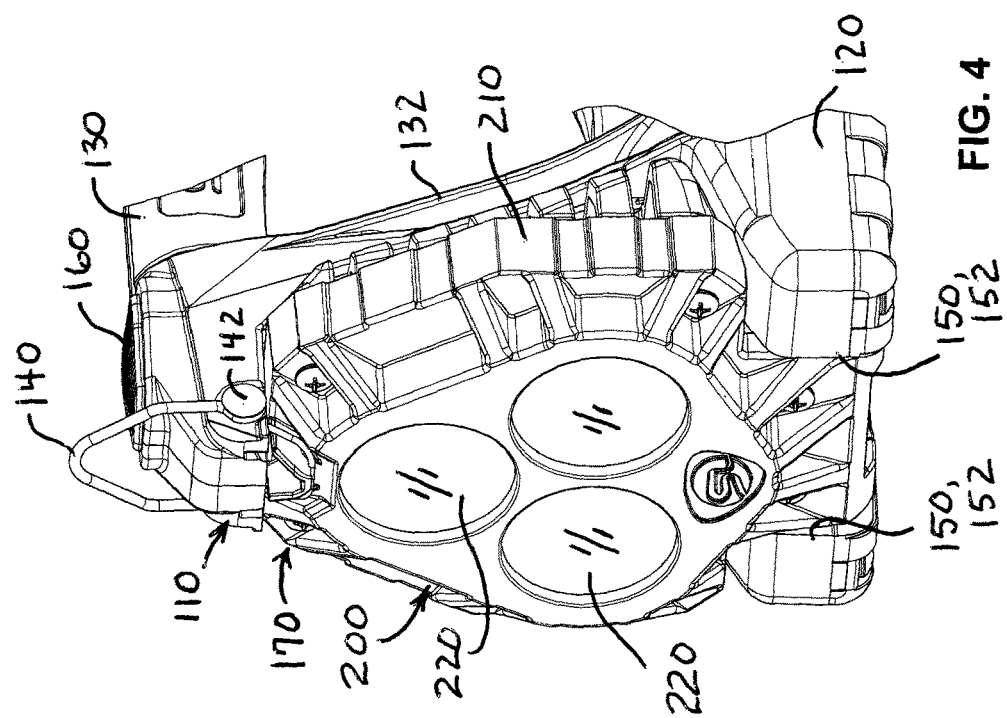
FIG. 4 is a perspective view of an example embodiment of the light head of the example portable light of FIGS. 1 through 3.

FIGS. 3A and 3B are front and rear perspective views, respectively, of the example portable light 100 with an example embodiment of a light head 200 thereof pivoted relative thereto; FIG. 4 is a perspective view of an example embodiment of the light head 200 of the example portable light 100 of FIGS. 1 through 3, and FIG. 4A is an enlarged exploded perspective view of an example D-ring 140 and example head latch 170 of the light head 200 of FIG. 4; and FIGS. 5A through 5C are perspective views of an example latch arrangement 170 with the example head latch member 172 in clear (unlocked), locked and stowed positions, respectively.

Light head 200 is pivotably mounted in pivot supports 150 between forward ends 122 of base 120 so as to pivot about an axis transverse to base 120 and handle 130. Each pivot support 150 includes a substantially cylindrical projection 202 that extends outwardly from the light head 200 and into a substantially cylindrical receptacle 152 at the inner side of the forward end 122 of base 120, with both projections 202 and both receptacles 152 being coaxial, i.e. along a common axis transverse to base 120.

While light head is illustrated in a pivoted position that is about 45° from its stowed position closely adjacent to forward handle support 132, light head 200 may be pivoted by at least 150° from its stowed position, and preferably at least about 180° from its stowed position, thereby to direct light rearwardly along the bottom of base 120 of light housing 110. It can be seen that housing 210 of light head 200 has a front housing 230 and a rear housing 240 and that there are plural slots in rear housing 240, e.g., for enabling air flow for cooling the light sources 220 therein.

In one embodiment, D-ring 140 and head latch D-ring 170 are pivotably mounted at the upper forward end of light 100, e.g., at the forward end of handle 130. D-Ring 140 is formed into a respective ring 140R at each of its ends wherein rings 140R are configured so that a common axis passes through both rings 140R. Similarly, head latch D-Ring 170 is a latch loop 172 or latch ring 172 that is formed into a respective ring 172R at each of its ends wherein rings 172R are configured so that a common axis passes through both rings 172R. Housing 110 has a through hole 114 through which pivot pin 142 passes with the ring ends 140R of D-ring 140 straddling the exterior of housing 110 at through hole 114 and with the ring ends 172R of head latch loop 172 in a recess thereat, whereby both D-ring 140 and head latch loop 172 are pivotable on pivot pin 142. Typically, pin 142 has an enlarged diameter, e.g., a head, at one end thereof and the distal end thereof is peened or swaged over a washer 144 that is adjacent to end ring 140R of D-ring 140.

Pivot pin 142 also passes through a switch actuator assembly 160 including an electrical switch 162 for controlling operation of light 100 which is actuated via an exposed switch actuator 164 which is accessible externally to light 100, e.g., near the forward end of handle 130. Actuator 164 is typically of a flexible material so as to deform when pressed to transfer force to switch 162 thereby to effect electrical actuation thereof.

In assembly, pivot pin 142 is inserted through an end ring 140R of D-ring 140, into hole 114 of housing 110, through an end ring of latching ring 170, through switch actuator assembly 160, through the other end ring of latching ring 170, through the remainder of hole 114, through the other end ring 140R of D-ring 140, and through washer 144, after which the end of pivot pin 142 is peened or swaged so as to not be removable.

Head latch 170 including latch loop 172 may be pivoted outwardly from light housing 110 into a position 1 as illustrated in FIG. 5A whereby it is clear of or away from head 200 thereby allowing head 200 to be freely pivoted toward or away from light housing 110. Light housing 110 preferably has a pair of slots 170S at the forward end of handle 130, e.g., in the underside of switch assembly 160, thereof that have an interference fit with latch loop 172 for retaining latch loop 172 in the clear position.

The interference fit for retaining latch loop 172 in position may be provided by the center-to-center distance between the slots 170S being slightly larger than is the center-to-center spacing of the sides of latch loop 172, or by the center-to-center distance between the slots 170S being slightly smaller than is the center-to-center spacing of the sides of latch loop 172, or by the slots 170S each being slightly narrower in width than the diameter of the wire or rod from which latch loop 172 is formed.

Head latch 170 including latch loop 172 may be pivoted inwardly toward light housing 110 into a position 2 whilst light head 200 is seated or stowed, e.g., pivoted upward so as to be close to light housing 110, as illustrated in FIG. 5B whereby latch loop 172 engages a projection 217 or other feature 217 of light head 200 thereby to engage and retain, e.g., lock, light head 200 adjacent to light housing 110. Latch projection 217 of light head 200 is preferably of like size or slightly larger than is the opening in latch loop 172 for having an interference fit therewith to retain latch 170 in the latched or locked position wherein it engages projection 217 of head 200, thereby to retain head 200 in its stowed position adjacent to light housing 110.

Head latch 170 including latch loop 172 may be pivoted inwardly toward light housing 110 into a position 3 whilst light head 200 is pivoted away from its seated, e.g., pivoted upward, position so as to be close to the underside of the forward end of handle 130, e.g., to the underside of switch assembly 160, of light housing 110 as illustrated in FIG. 5C whereby latch loop 172 is stowed or nested against light housing 110 and does not engage or retain light head 200 relative to light housing 110. Light housing 110 preferably has a recess 170R in the underside of the forward end of handle 130 thereof into which latch loop 172 is received in the stowed position. This recess 170R is slightly narrower or smaller than the dimension across latch loop 172 thereby to have an interference fit for retaining latch loop 172 therein when in the stowed position.

Thus light 100 is configured to give a user the ability to use or not use latch ring 170 as may be best in that user's view and circumstance, because latch ring 170 can be positioned so as to not interfere with the pivoting of light head 200 and/or can be positioned to latch or to release light head 200 for pivoting relative to its stowed or seated position.

Figure 6B:
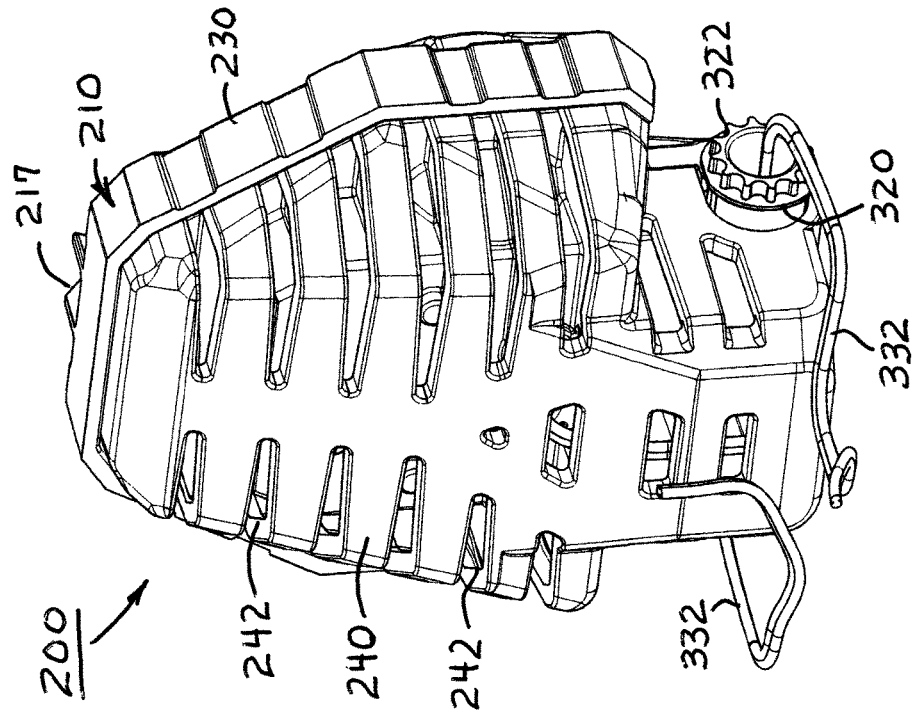
FIGS. 6A and 6B are front and rear perspective views, respectively, of the example light head apart from the example portable light.
Figure 6A:
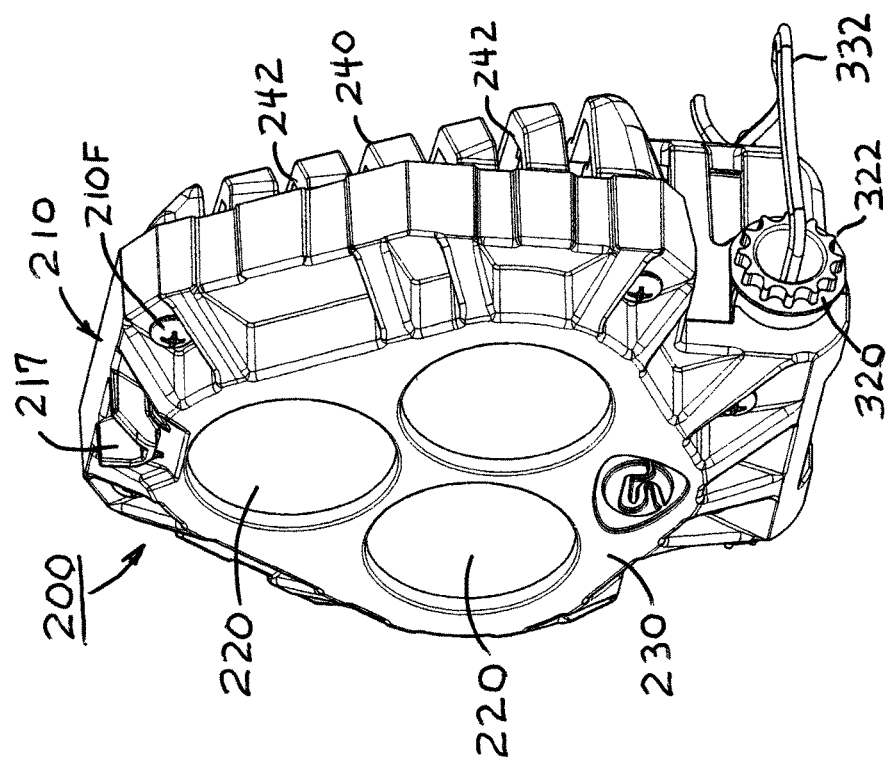
Figure 7A:
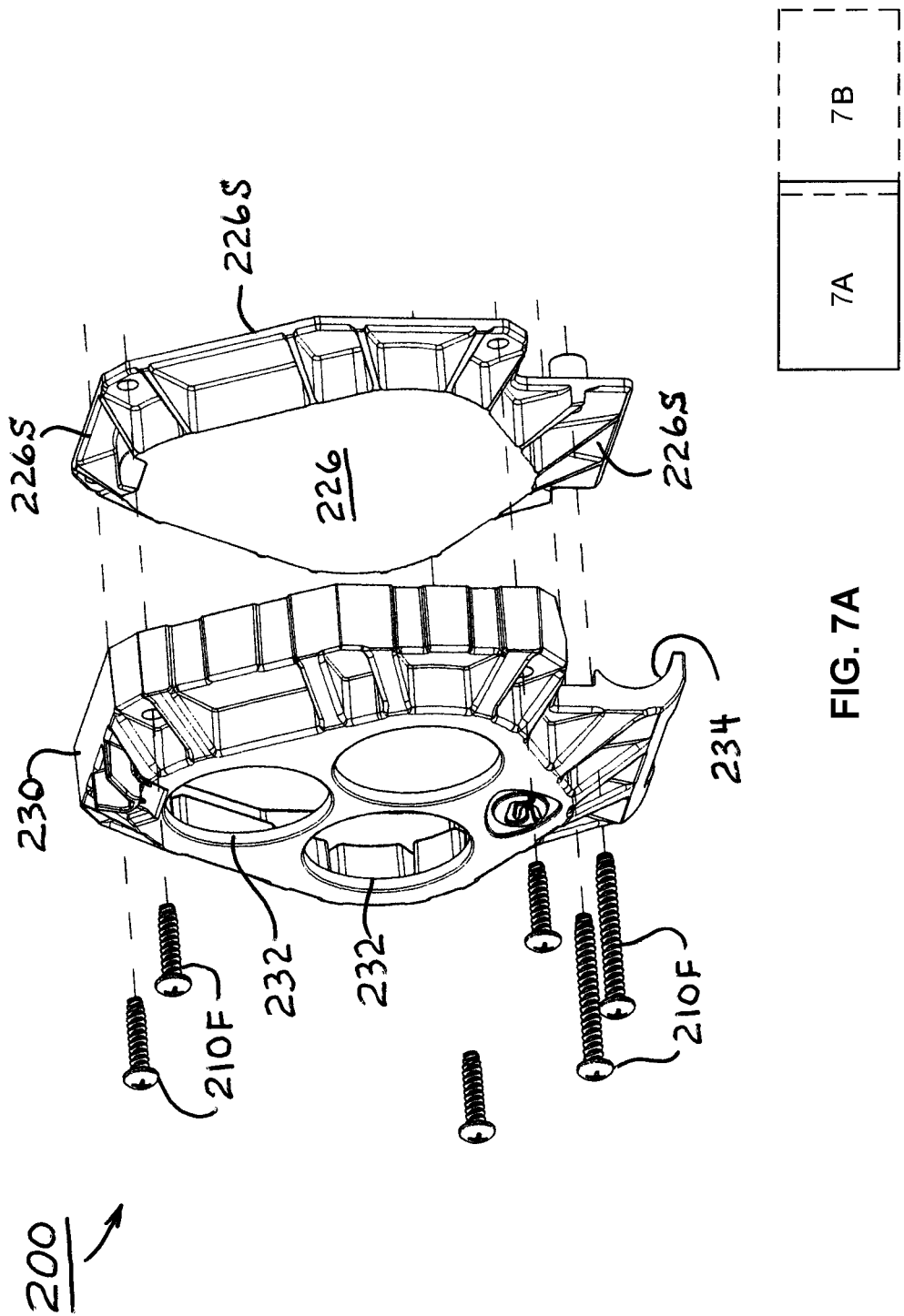
FIGS. 7A and 7B together provide on two sheets a single exploded view of the example light head.
Figure 7B:
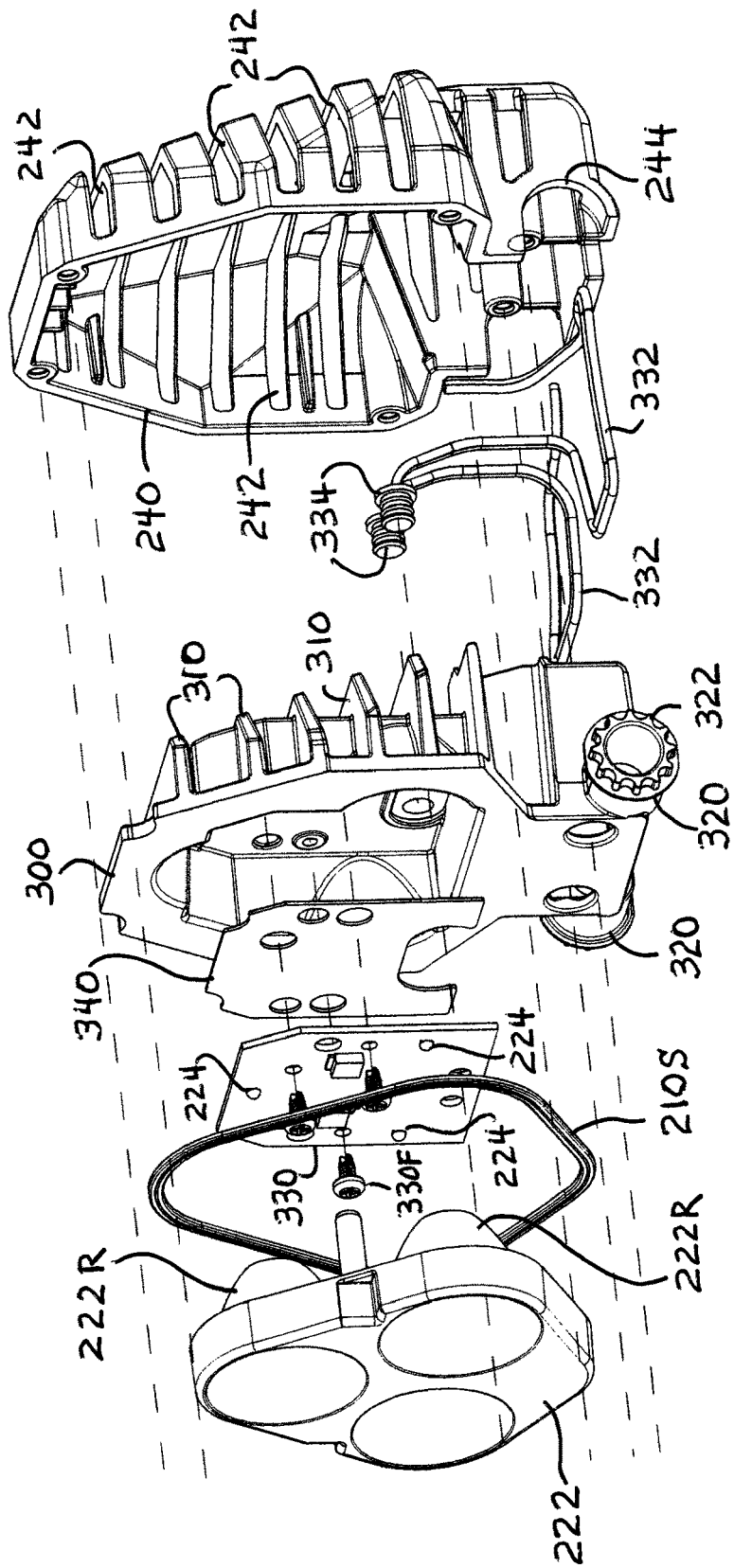

FIGS. 6A and 6B are front and rear perspective views, respectively, of the example light head 200 apart from the example portable light 100; and FIGS. 7A and 7B together provide on two sheets a single exploded view of the example light head 200. Light head 200 includes the light source 220 of light 100. Head housing 210 of light head 200 includes a forward housing part 230 that has plural openings 232 that correspond in shape and location with light sources 220 and a rearward housing part 340 that preferably has a plurality of slots or other openings 242 for facilitating cooling of a heat sink 300 contained within housing 210. A feature 217 at one end of head housing 210, e.g., the top end thereof, is provided as part of a latch arrangement 170 therefor described herein and another feature 320, 322 at the opposite end thereof, e.g., at the bottom end thereof, is provided as part of a pivotable mounting for light head 200, also described herein.

In one typical example embodiment, light head 200 includes plural, e.g., three, LED light sources 220 arranged in a triangular array at the exposed forward face thereof. Each light source 220 includes an LED 224 seated at or near the base or narrow end of a reflective element 222. The plural light sources 220 may be energized together, or one at a time, or in combinations, and may produce white light and/or colored light, as may be desired. Typically, the plural LEDs 224 may be supported on a common substrate 330, e.g., a common circuit board 330, or on separate substrates 330. Reflective element 222 may be have a shaped reflective surface 222 or may be a solid optically clear element 222 such as a totally internally reflective (TIR) optical element 222.

One typical reflective element 222 includes a curved reflective surface 222 having a rearward narrower end at which a light emitting element 224, e.g., an LED 224, is disposed, e.g., on a substrate 330, and having a relatively wider open end from which light from emitting element 222 exits, either coming directly from LED 224 or indirectly via reflective surface 222. The surface of reflector 222 may be generally parabolic in shape or may have any other suitable, typically curved, shape as may be desired to produce a beam of light having desired characteristics, e.g., a spot beam or a flood beam, or something in between.

An optically clear lens 226 typically covers the wider open ends of reflective elements 222, e.g., a single lens 226 may be provided that has a relatively large substantially flat portion covers all three light sources 220 (as illustrated) or separate lenses 226 may be provided, e.g., one for each light source 220. Typically lens 226 has a somewhat triangular shape with rounded angles so as to cover the triangular array of light sources 220 with sides 226S that generally follow the shape of the periphery of forward housing 230 so as to be retained between front and rear housing 230, 240 when they are assembled and fastened by fasteners 210F.

Alternatively, each separate lens 226 may have a generally circular shape similar to the open end of reflector 222 and seats in a circular opening 232 in front housing part 230. In either configuration, and typically, front and rear housing parts 230, 240 and lens 226 are sealed relative to each other by a seal 210S to reduce entry of moisture, debris and other undesirable substances.

Electrical substrate 330 that supports and provides electrical connections to LEDs 224 mounted thereon is supported by a thermally conductive heat sink 300 and is separated therefrom by an electrical insulator 340. Substrate 330 may be attached to heat sink 300 by plural fasteners 330F, e.g., screw type fasteners 330F, with insulator 340 interposed between substrate 330 and heat sink 300, and the interfaces therebetween may have a thermal grease or other thermally conductive material for reducing the thermal resistance therebetween to facilitate conducting heat away from LEDs 224.

Preferably, heat sink 300 has a concave forward side into which substrates 330, 340 are disposed and has a convex rearward side on which are a plurality of raised flanges 310 or similar features 310 that increase the surface area of heat sink 300, thereby to reduce its thermal resistance and the operating temperature of LEDs 224. Preferably heat sink 300 is formed integrally of a thermally conductive material, such as a thermally filled nylon or other plastic or as a cast, formed or machined aluminum heat sink 300.

Heat sink 300 also has a pair of outwardly extending substantially coaxial and cylindrical projections 320 at the lower end thereof for cooperating with a pair of corresponding receptacles 152 of base 120 of light housing 110, for providing a pivotable joint between light head 200 and light housing 110. One or both cylindrical projections 320 may have a plurality of teeth 322 or other projections and/or recesses for providing a detent for the pivoting of light head 200, whereby head 200 tends to remain in position at certain pivot angles when manually moved to such positions. Each of front and rear housings 230, 240 has a substantially semicircular recess 234, 244 through which cylindrical projections 320 extend.

Electrical power is provided to LEDs 224 on substrate 330 via contacts 334 at the ends of one or more electrical conductors 332 that pass through central openings through one or both pivot projections 320 for conducting electrical power from battery 190 via switch 160 and any control circuitry that may be provided. Control circuitry is provided for operating light sources 220 and for charging battery 190. A circuit thereof for providing the desired level of current flowing in each of the LEDs 224 is preferably provided on substrate 330, and may include one or more DC converters, one or more current regulators, a processor or controller such as a micro-processor, and the like. A circuit thereof for providing the desired level of charging current flowing to battery 190 in housing 110 is preferably provided on a substrate located in the lower part of housing 110 and may include a DC converter, a voltage limiting circuit, a current limiter and/or regulator, a processor or controller such as a micro-processor, and the like.

Figure 8:
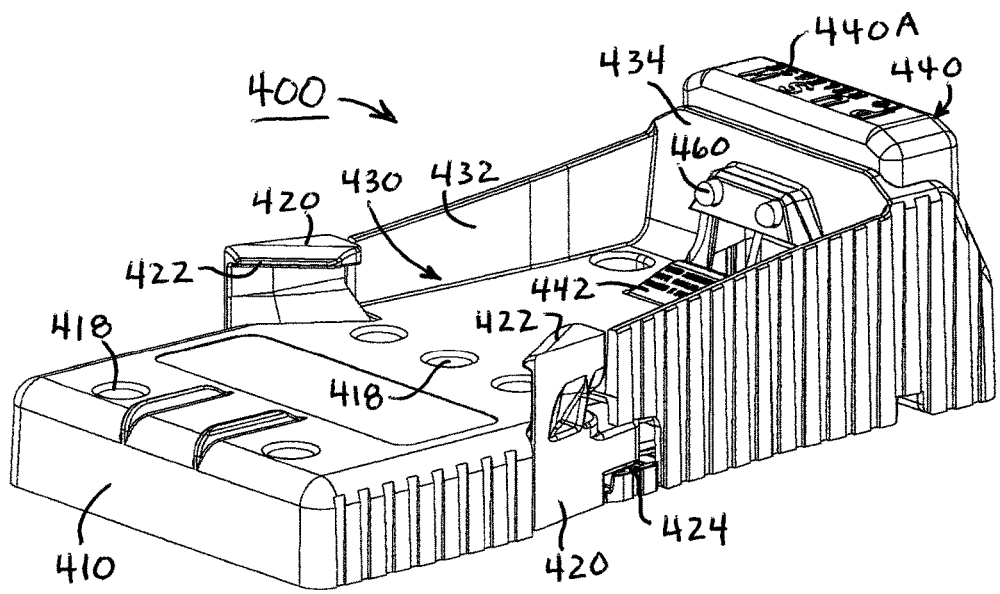
FIG. 8 is a perspective view of the example embodiment of the charging device.
Figure 9A:
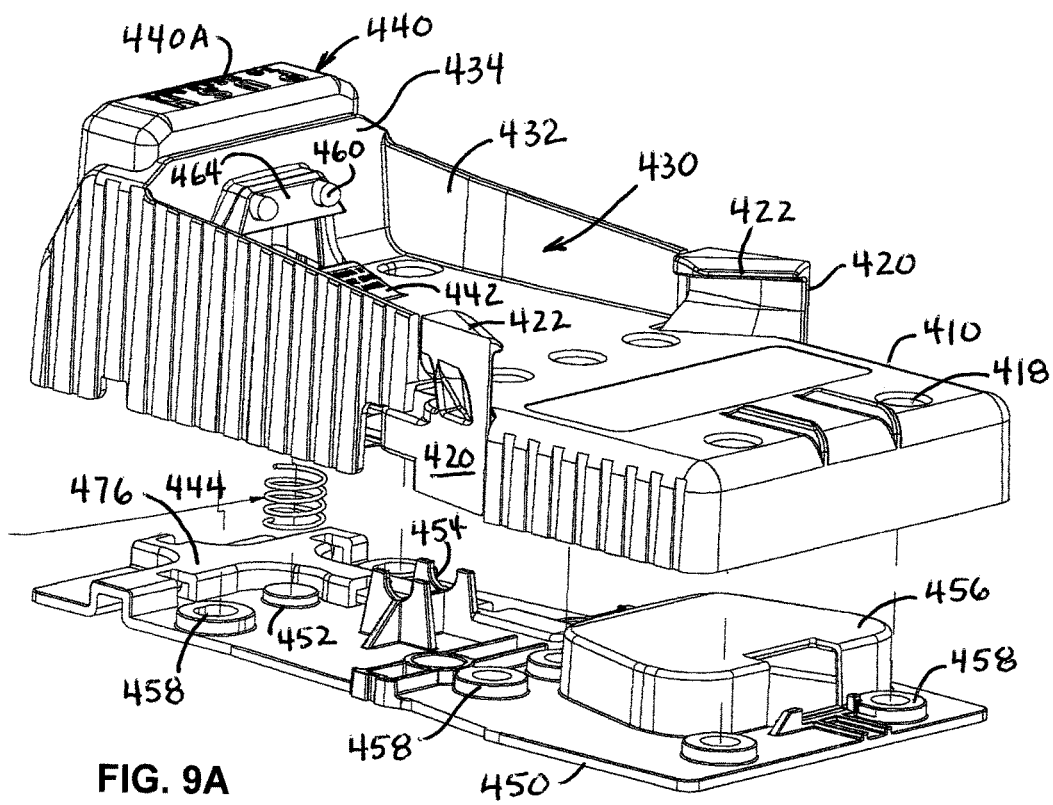
FIG. 9A is an exploded view of the example charging device with a charger housing thereof spaced apart from a bottom cover thereof.
Figure 9B:
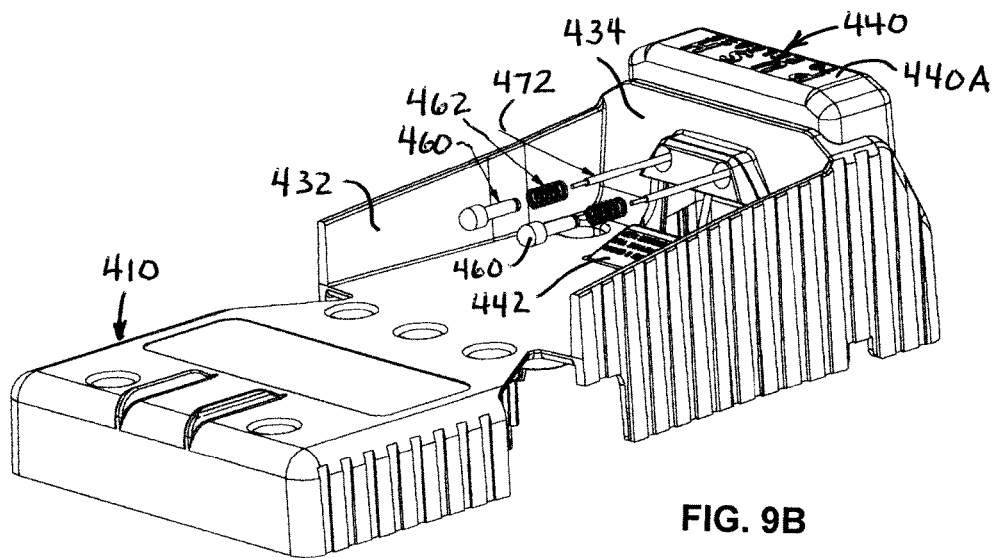
FIG. 9B is a partially exploded perspective view of the charger housing.
Figure 9C:
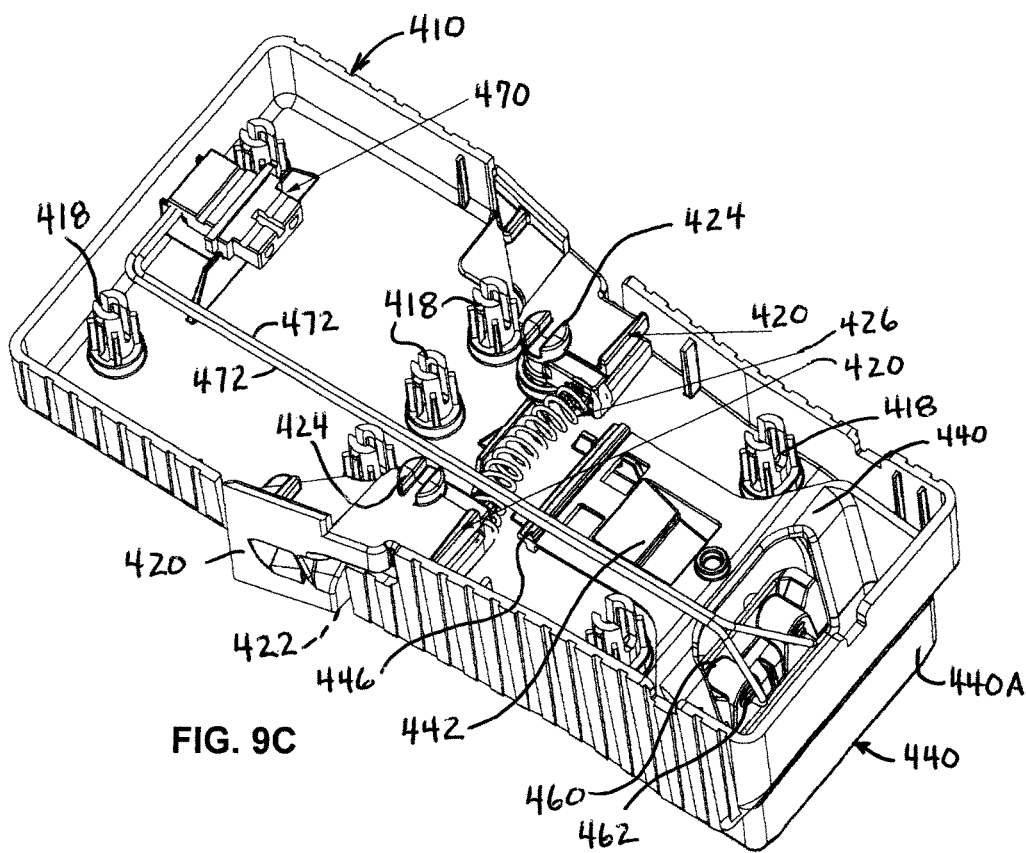
FIG. 9C is a perspective view of the example charger housing showing the interior arrangement thereof.
Figure 10:
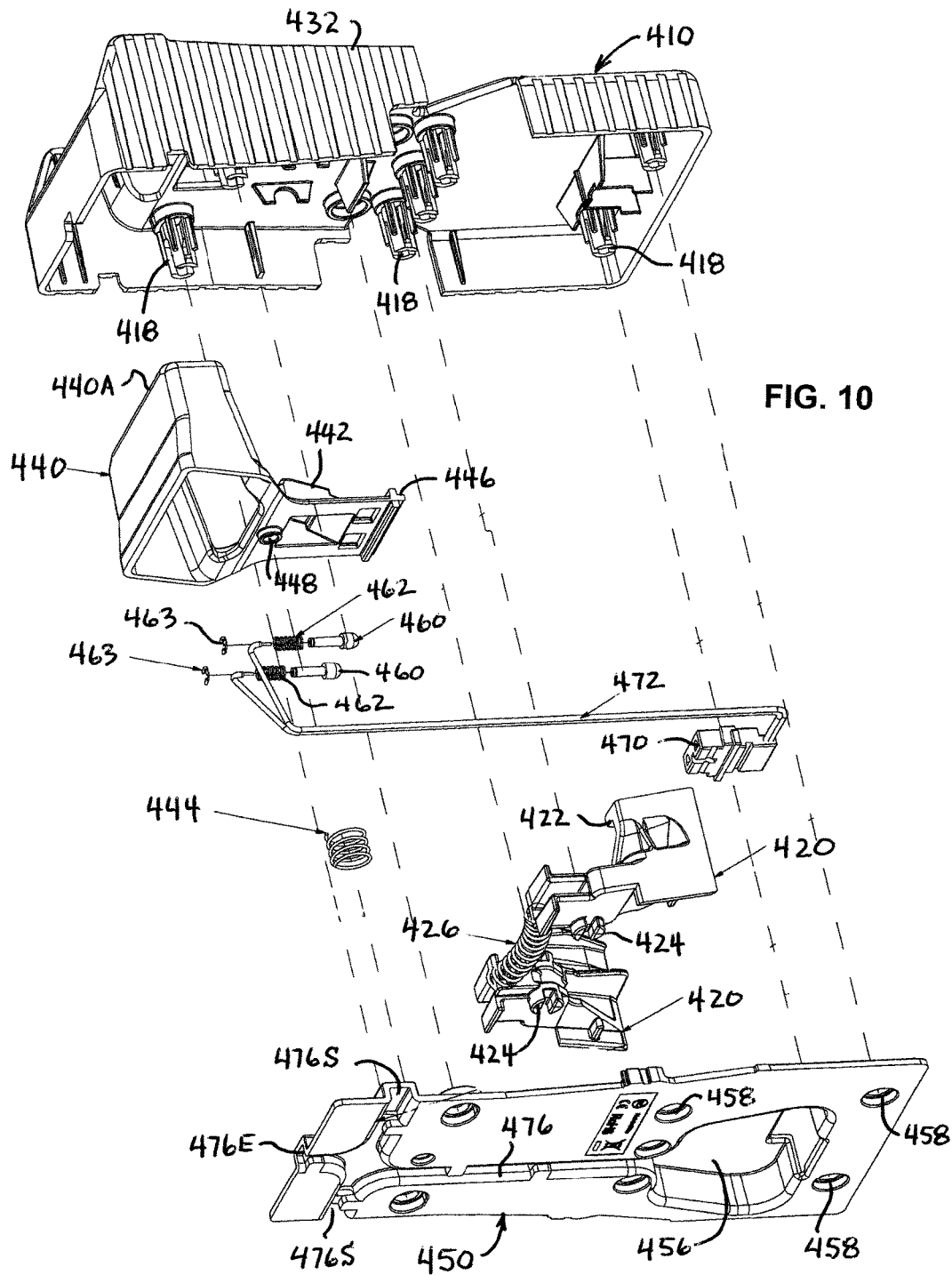
FIG. 10 is an exploded view of the example charging device of FIGS. 8 and 9.

FIG. 8 is a perspective view of the example embodiment of the charging device 400, and FIGS. 8A and 8B are plan views of the charging device 400 with latch arms 420 thereof in retracted and extended positions, respectively; FIG. 9A is an exploded view of the example charging device 400 with a charger housing 410 thereof spaced apart from a bottom cover 450 thereof, FIG. 9B is a partially exploded perspective view of the charger housing 410, and FIG. 9C is a perspective view of the example charger housing 410 showing the interior arrangement thereof; and FIG. 10 is an exploded view of the example charging device 400 shown in FIGS. 8 through 9C.

Charger device 400 housing 410 has sidewalls 432 and end wall 434 that define a receptacle 430 into which the base 120 of light 100 can be placed for charging and recharging batteries 190 thereof. A pair of electrical contacts 460 located on end wall 434 of receptacle 430 are positioned so as to come into electrical contact with a corresponding pair of electrical contacts 192 (covered in a FIG. 3B) on the rearward end 124 of base 120 of light housing 110 of light 100 to carry charging current to light 100, e.g., to power source 190 thereof. Typically a biasing spring 462 is provided to move each charging contact 460 outwardly, i.e. towards the base 120 of a light 100 in receptacle 430, thereby to maintain contact and contact pressure against electrical contacts 192 of light 100.

Charging device 400 receives electrical power for charging light 100 via an electrical connector 470 located in connector housing 456 of bottom cover 450, and electrical power is conducted from connector 470 to electrical contacts via electrical wires 472, thereby to complete the charging circuit. Charging power from an external source, e.g., a vehicle electrical system, and DC power source, and/or an AC/DC power pack or converter, or any other suitable electrical power source.

Release actuator 440 is in one example embodiment an L-shaped member having an actuator portion 440A at or near the end of the shorter leg of the "L" and a pivot axle 446 at or near the end of the longer leg of the "L." Pivot axle 446 provides a pivot about an axis that is parallel to the bottom of receptacle 430 and is transverse to charger housing 410. Latch member 442 is located on the longer leg of the "L" intermediate pivot axle 446 and the junction of the longer and shorter legs of the L-shaped member 440. It is noted that release actuator 440 could be configured in different shapes than an "L" and/or for translational motion or for any other motion that will allow latch member 442 to move in response to movement of actuator portion 440A.

A latch member 442 that is part of release actuator 440 movably extends into receptacle 430 on the floor thereof. Release actuator 440 is pivotably mounted with its pivot axle 446 seated in release actuator pivot seat 454 of charger bottom cover 450 on axle 446 and is biased upwardly by release actuator bias member 444, e.g., release actuator bias spring 444, so that latch member 442 is moved upwardly into the space of receptacle thereby to latch with a corresponding latching recess 126 in the base 120 of light 100. The ends of release actuator spring 444 are positioned by respective spring seats, e.g., by release actuator spring seat 452 on charger cover 450 and a corresponding seat 448 on the underside of release actuator 440.

Latch member 442 retracts when light 100 is being inserted into receptacle 430 because the base 120 of light 100 bears against latch member 442 causing it to pivot downwardly to allow base 120 to pass and become fully seated in receptacle 430 whereat latch member 442 moves upwardly into latching recess 126 of base 120 of light 100, thereby to retain light 100 in receptacle 430. Latch member 442 moves downwardly when release actuator 440 is pushed or pressed downwardly, e.g., at its actuator end 440A which is exposed at the rear (or bottom) of charging device 400, thereby to be removed from latching recess 126 to release the base 120 of light 100 for removal from charging device 400.

A pair of opposing latch arms 420 are pivotably mounted on housing 410 at pivot 424 and are pivotable thereon as indicated by the double ended arrows in FIGS. 8A and 8B. Each latch arm 420 has an inwardly extending flange 422 configured to grasp or otherwise engage a shoulder of base 120 of light 100 when light 100 is in receptacle 430 and latch arms 420 are pivoted to their respective inward positions. When latch arms 420 are pivoted outwardly flanges 422 thereof are separated by a distance sufficient to allow base 120 of light 100 to pass therebetween. Latch arms 420 pivot about respective axes that are substantially perpendicular to the bottom of receptacle 430 and parallel to the side walls 432 thereof, whereby the ends 422 of latch arms 420 are pivotable to move into and out of the receptacle 430 of charging device 400 for facilitating the placement of light 100, e.g., the base 120 thereof, therein and the removal of light 100 therefrom.

A latch arm biasing member 426, e.g., a latch arm spring 426, is configured to bias latch arms 420 and flanges 422 thereof inwardly, i.e. to move towards each other for engaging the base 120 of light 100 when light 100 is seated in receptacle 430 of charging device 400. Spring 426 is in compression between parts of both latch arms 420 that are on the side of pivots 424 opposite the flanges 422 thereof thereby to bias latch arms 420 and flanges 422 thereof to move inwardly. Latch arms 420 are moved outwardly by applying a force sufficient to overcome the inward bias imparted by spring 426, e.g., by the base 120 of light 100 being pressed or pushed into receptacle 430 of charging device 400.

In one typical embodiment, when latch arms 420 are moved inwardly under the bias of spring 426, the respective ends of inwardly extending flanges 422 of lath arms 420 are each at an angle of about 35° with respect to the longitudinal axis of charging device 400 (e.g., defining a total angle of about 70° between the flanges 422). When latch arms 420 are moved outwardly by overcoming the bias of spring 426, the respective ends of inwardly extending flanges 422 of latch arms 420 are each at an angle of about 45° with respect to the longitudinal axis of charging device 400 (e.g., defining a total angle of about 90° between the flanges 422).

To facilitate the base 120 of light 100 being snapped into receptacle 430, it is preferred that the inwardly extending flanges 422 of pivoted latch arms 420 have a triangular shape and are formed, shaped or sloped to have a shaped surface 422C, e.g., with a chamfer or a bevel 422C, at a suitable angle, e.g., about 45°, on their outer surfaces so that force applied thereto by the base 120 of light 100 when it is being moved downward when being inserted into receptacle 430 produces an outwardly directed force on latch arms 420, thereby to facilitate their pivoting outwardly to allow base 120 to enter receptacle 430. Also preferably, the side edges of base 120 are also shaped or sloped so as to provide a complementary force transfer to latch arms 420 and to urge them to pivot in an outward direction.

Bottom cover 450 fits into the bottom of charger housing 410 and may be fastened into charger housing 410 by any suitable fastener. In one embodiment, charger housing 410 has a plurality of snap-together fastener posts 418 that align with and enter into corresponding fastener receptacles 458 of bottom cover 450 when bottom cover 450 is inserted into the bottom of charger housing 410 and snap securely together therein. Fastener posts 418 preferably have opposing flexible hooks that are compressed inwardly when a fastener post 418 enters into a fastener receptacle 458 and which snap outwardly when fastener post 418 is fully seated in a receptacle 458, thereby to snap together in a secure manner. Some or all fastener posts 418 have or may have an opening therethrough through which a screw or other fastener may be inserted for mounting charging device 400 to a surface, e.g., a wall, a frame, a vehicle or another support.

Corresponding seats and other features of charging housing 410 and of bottom cover 450 serve to retain various parts of charging device 400, e.g., latch arms 420 and release actuator 440 and their respective springs, as well as connector 470, in their predetermined positions within charging device 400.

Bottom cover 450 may be formed to provide one or more channels 476 on the exposed or external surface thereof for the convenient routing of wires from the external electrical power source that connects to electrical connector 470 of charging device 400 to provide charging current for charging and recharging the electrical power source 190 of light 100 via charging device 400. In the illustrated example, a longer channel 476 extends over almost the entire length of bottom cover 450 connecting with shorter channels from side openings 476S and end opening 476E so that wires may be routed in channels 476 from those openings 476S, 476E to connector housing 456 whereat an electrical connector of the external charger mates with electrical connector 470 of charging device 400.

In a typical embodiment, light housings 110, 120, head housing 210, 230, 240, charger housing 410 and bottom cover 450, as well as latch arms 420, actuator 440 and like parts may be formed of a reinforced nylon, engineered nylon, acrylonitrile butadiene styrene (ABS), polycarbonate, or other suitable plastic material, and heat sink 300 may be of a thermally conductive reinforced nylon, engineered nylon, acrylonitrile butadiene styrene (ABS), polycarbonate, or other suitable thermally conductive plastic material, e.g., a plastic that includes (is filled with) thermally conductive particles, flakes, strands or other thermally conductive material, or of a metal such as aluminum, brass and the like, or another suitable thermally conductive material. D-rings 140, latch loop 170 and the like are typically formed from steel wire or rod.

Therein, one typical light 100 is about 7.5 inches (about 19.1 cm) long, about 4.3 inches (about 10.9 cm) wide and about 6.3 inches (about 16 cm) high and weighs about 39.7 ounces (about 1.1 kg). An associated typical charging device is about 8.7 inches (about 22.1 cm) long, about 4.5 inches (about 11.4 cm) wide and about 2.6 inches (about 6.6 cm) high and weighs about 9.2 ounces (about 0.26 kg).

A portable light 100 may comprise: a light body having a handle and a base for receiving a source of electrical power; a light head pivotably mounted at a base end thereof to a forward end of the light body and having a projection at an end distal the base end thereof, the light head may include a light source energizable for producing light; a switch supported by the light body and actuatable for energizing the light source; and a latch ring pivotably mounted at the forward end of the light body and configured for being pivoted to engage the projection of the light head when the light head is pivoted to be adjacent to the forward end of the light body, the latch ring being pivotable to a first position whereat it does not engage the projection of the light head, whereby the light head is not constrained by the latch ring, and being pivotable to a second position whereat it engages the projection of the light head when the light head is pivoted to be adjacent the forward end of the light body. The light body may have at its forward end a slot or a recess or a slot and a recess, wherein the slot and/or recess are configured to receive the latch ring therein when the latch ring is pivoted to the first position. The slot and/or recess may be configured to have an interference fit with the latch ring thereby to retain the latch ring in the first position. The latch ring may be pivotable to a third position whereat it is stowed in a further recess of the light body. The further recess may be configured to have an interference fit with the latch ring thereby to retain the latch ring in the third position. The latch ring may have an end ring at each of opposing ends thereof, wherein the pivotable mounting of the latch ring includes a pivot pin that passes through the end rings of the latch ring and through an opening in the light body. The portable light may include a D-ring having an end ring at opposing ends thereof, wherein the pivot pin passes through the end rings of the D-ring, whereby the latch ring and the D-ring are independently pivotable on the pivot pin. The light body may have a base configured for the light being placed on a surface, wherein the light head is pivotably mounted with its base end pivoted at a forward end of the base of the light body, and wherein the latch ring is pivotably mounted on the forward end of the light body at a location distal the base of the light body whereat the latch ring is pivotable to engage the projection of the light head.

A charging device 400 for a portable light having a light body containing a rechargeable battery, the light body of the portable light having opposing sides and a latching recess of a predetermined shape in a base thereof, and having one or more charging contacts for receiving electrical power for charging the rechargeable battery, the charging device may comprise: a charger housing having a receptacle configured to receive the light body of the portable light and having one or more charging contacts configured to make electrical connection to the one or more charging contacts of the portable light when the portable light is disposed in the receptacle of the charger housing; a release latch moveably mounted to the charger housing and having a projection, wherein when the release latch is moved to a first position the projection of the release latch extends into the receptacle of the charger housing for engaging the portable light when the portable light is disposed in the receptacle of the charging device, whereby the portable light is retained in the charging device, and wherein when the release latch is moved to a second position the projection of the release latch does not extend into the receptacle of the charger housing and does not engage the portable light when the portable light is disposed in the receptacle of the charging device, whereby the portable light is released to be removed from the receptacle of the charging device; a first biasing element configured to bias the release latch towards the first position, whereby the release latch is biased to move to retain the portable light in the charging device; a pair of latch arms each moveably mounted on the charger housing in opposing positions at opposite sides of the receptacle thereof, the latch arms being moveable to move closer together to extend into the receptacle and to move farther apart to be out of the receptacle, wherein each latch arm has a distal end configured to engage the light body of the portable light when the portable light is disposed in the receptacle of the charging device and the latch arms are moved to be closer together and to not engage the light body of the portable light when the portable light is disposed in the receptacle of the charging device and the latch arms are moved to be farther apart; and a second biasing element configured to bias the latch arms towards each other, whereby the latch arms are biased to move into the receptacle to retain the portable light in the charging device. The projection of the release latch may have a shape complementary to the latching recess of predetermined shape on the base of the portable light, wherein when the release latch is moved to the first position the projection of the release latch engages the latching recess of the portable light when the portable light is disposed in the receptacle of the charging device, and wherein when the release latch is moved to the second position the projection of the release latch does not extend into the receptacle of the charger housing and does not engage the latching recess of the portable light when the portable light is disposed in the receptacle of the charging device. The release latch may be pivotably mounted to move into and out of the receptacle of the charging device. The distal end of each latch arm may include an inwardly directed flange configured to engage the light body of the portable light when the portable light is disposed in the receptacle of the charging device. The inwardly directed flange of each latch arm may be: triangular in shape; or chamfered or beveled; or triangular in shape and chamfered or beveled, wherein the latch arms are movable outwardly by the light being inserted into the receptacle of the charging device or by the light being removed from the receptacle of the charging device, whereby the portable light is insertable into and is removable from the charging device in a snap-in, snap-out manner. The respective flanges of each of the latch arms engage a respective shoulder on the side of the light body of the portable light.

A portable light and charging device therefor, wherein the portable light may comprise: a light body having a handle and a base for receiving a source of electrical power, having a latching recess in the base thereof, and having one or more charging contacts configured to make electrical connection to the source of electrical power; a light head pivotably mounted at a base end thereof to a forward end of the light body and having a projection at an end distal the base end thereof, the light head may include a light source energizable for producing light; a switch supported by the light body and actuatable for energizing the light source; and a latch ring pivotably mounted at the forward end of the light body and configured for being pivoted to engage the projection of the light head when the light head is pivoted to be adjacent to the forward end of the light body, the latch ring being pivotable to a first position whereat it does not engage the projection of the light head, whereby the light head is not constrained by the latch ring, and being pivotable to a second position whereat it engages the projection of the light head when the light head is pivoted to be adjacent the forward end of the light body; and wherein the charging device may comprise: a charger housing having a receptacle configured to receive the light body of the portable light and having one or more charging contacts configured to make electrical connection to the one or more charging contacts of the portable light when the portable light is disposed in the receptacle of the charger housing; a release latch moveably mounted to the charger housing and having a projection, wherein when the release latch is moved to a first position the projection of the release latch extends into the receptacle of the charger housing for engaging the portable light when the portable light is disposed in the receptacle of the charging device, whereby the portable light is retained in the charging device, and wherein when the release latch is moved to a second position the projection of the release latch does not extend into the receptacle of the charger housing and does not engage the portable light when the portable light is disposed in the receptacle of the charging device, whereby the portable light is released to be removed from the receptacle of the charging device; a first biasing element configured to bias the release latch towards the first position, whereby the release latch is biased to move to retain the portable light in the charging device; a pair of latch arms each moveably mounted on the charger housing in opposing positions at opposite sides of the receptacle thereof, the latch arms being moveable to move closer together to extend into the receptacle and to move farther apart to be out of the receptacle, wherein each latch arm has a distal end configured to engage the light body of the portable light when the portable light is disposed in the receptacle of the charging device and the latch arms are moved to be closer together and to not engage the light body of the portable light when the portable light is disposed in the receptacle of the charging device and the latch arms are moved to be farther apart; and a second biasing element configured to bias the latch arms towards each other, whereby the latch arms are biased to move into the receptacle to retain the portable light in the charging device. The light body may have at its forward end a slot or a recess or a slot and a recess, wherein the slot and/or recess are configured to receive the latch ring therein when the latch ring is pivoted to the first position. The slot and/or recess may be configured to have an interference fit with the latch ring thereby to retain the latch ring in the first position. The latch ring may be pivotable to a third position whereat it is stowed in a further recess of the light body. The further recess may be configured to have an interference fit with the latch ring thereby to retain the latch ring in the third position.

The latch ring may have an end ring at each of opposing ends thereof, and wherein the pivotable mounting of the latch ring may include a pivot pin that passes through the end rings of the latch ring and through an opening in the light body. The portable light may include a D-ring having an end ring at opposing ends thereof, wherein the pivot pin passes through the end rings of the D-ring, whereby the latch ring and the D-ring are independently pivotable on the pivot pin. The light body may have a base configured for the light being placed on a surface, wherein the light head is pivotably mounted with its base end pivoted at a forward end of the base of the light body, and wherein the latch ring is pivotably mounted on the forward end of the light body at a location distal the base of the light body whereat the latch ring is pivotable to engage the projection of the light head. The projection of the release latch may have a shape complementary to the latching recess of predetermined shape on the base of the portable light, wherein when the release latch is moved to the first position the projection of the release latch engages the latching recess of the portable light when the portable light is disposed in the receptacle of the charging device, and wherein when the release latch is moved to the second position the projection of the release latch does not extend into the receptacle of the charger housing and does not engage the latching recess of the portable light when the portable light is disposed in the receptacle of the charging device. The release latch may be pivotably mounted to move into and out of the receptacle of the charging device. The distal end of each latch arm may include an inwardly directed flange configured to engage the light body of the portable light when the portable light is disposed in the receptacle of the charging device. The inwardly directed flange of each latch arm may be: triangular in shape; or chamfered or beveled; or triangular in shape and chamfered or beveled, wherein the latch arms are movable outwardly by the light being inserted into the receptacle of the charging device or by the light being removed from the receptacle of the charging device, whereby the portable light is insertable into and is removable from the charging device in a snap-in, snap-out manner. The respective flanges of each of the latch arms may engage a respective shoulder on the side of the light body of the portable light.

A portable light having a pivotable light head may comprise: a light body for receiving a source of electrical power; a light head pivotably mounted at a base end thereof to the light body, wherein the light head includes a light source energizable for producing light; the light head having a pair of outwardly extending substantially coaxial and cylindrical projections near the base end thereof; the light body having a pair of substantially coaxial receptacles cooperating with the pair of outwardly extending substantially coaxial and cylindrical projections of the light head for providing a pivotable joint between the light head and the light body, wherein one or both of the cylindrical projections has a plurality of projections and/or recesses thereon for providing a detent for the pivoting of the light head relative to the light body, whereby the light head tends to remain in a detent position at certain pivot angles relative to the light body when manually moved to such positions; and a switch actuatable for coupling electrical power from the source of electrical power to the light source for energizing the light source. The light body may have a base configured for the portable light being placed on a surface, wherein the light head is pivotably mounted with its base end pivoted near an end of the base of the light body. The portable light having a pivotable light head wherein at least one of the cylindrical projections of the light head and at least a corresponding one of the coaxial receptacles of the light body each has an opening therethrough, and wherein one or more electrical conductors pass through the openings of the at least one of the cylindrical projections and the corresponding one of the coaxial receptacles for conducting electrical power from the source of electrical power to the light source. The light source of the light head may include: a plurality of light emitting diodes each having an associated reflective element for directing a beam of light from the light emitting diode. The light head may include: a head housing and a heat sink for supporting the light source within the head housing; or a head housing and a heat sink for supporting the light source within the head housing, wherein the head housing may include a forward housing part having an opening that corresponds in shape and location with the light source and a rearward housing part; or a head housing and a heat sink for supporting the light source within the head housing, wherein the head housing may include a forward housing part having an opening that corresponds in shape and location with the light source and a rearward housing part that has a plurality of openings to facilitate cooling of the heat sink therein. The light head may include: a head housing and a heat sink for supporting the light source within the head housing, wherein the substantially coaxial and cylindrical projections extend outwardly from the heat sink through coaxial openings in the head housing. The plurality of projections and/or recesses of the one or both of the cylindrical projections may include a plurality of circumferential teeth thereon for providing the detent. The light head may have a latch projection at an end thereof distal from the base end thereof and wherein the light body may include a latch ring pivotably mounted on the light body at a location whereat the latch ring is pivotable to engage the latch projection of the light head when the light head is pivoted to be adjacent to the light body. The latch ring may be pivotable to a first position whereat it does not engage the latch projection of the light head, whereby the light head is not constrained by the latch ring, and may be pivotable to a second position whereat it engages the latch projection of the light head when the light head is pivoted to be adjacent the forward end of the light body, whereby the light head is constrained by the latch ring. The latch ring may be pivotable to a third position whereat it is stowed in a further recess of the light body. The further recess may be configured to have an interference fit with the latch ring thereby to retain the latch ring in the third position. The light body may have a slot or a recess or a slot and a recess, wherein the slot and/or recess are configured to receive the latch ring therein when the light head is pivoted away from the light body and the latch ring is pivoted toward the light body. The slot and/or recess may be configured to have an interference fit with the latch ring thereby to retain the latch ring therein. The portable light having a pivotable light head wherein the light body contains a rechargeable battery, the light body having opposing sides and a latching recess of a predetermined shape in a base thereof, and having one or more charging contacts for receiving electrical power for charging the rechargeable battery, the portable light may further comprise a charging device comprising: a charger housing having a receptacle configured to receive the light body of the portable light and having one or more charging contacts configured to make electrical connection to the one or more charging contacts of the portable light when the portable light is disposed in the receptacle of the charger housing; a release latch moveably mounted to the charger housing and having a projection, wherein when the release latch is biased to move toward a first position the projection of the release latch extends into the receptacle of the charger housing for engaging the portable light when the portable light is disposed in the receptacle of the charging device, whereby the portable light is retained in the charging device, and wherein when the release latch is moved to a second position the projection of the release latch does not extend into the receptacle of the charger housing and does not engage the portable light when the portable light is disposed in the receptacle of the charging device, whereby the portable light is released to be removed from the receptacle of the charging device; a pair of latch arms each moveably mounted on the charger housing in opposing positions at opposite sides of the receptacle thereof, the latch arms being biased to move toward each other so as to be closer together and to extend into the receptacle and to be movable farther apart to be out of the receptacle, wherein each latch arm has a distal end configured to engage the light body of the portable light when the portable light is disposed in the receptacle of the charging device and the latch arms are moved to be closer together and to not engage the light body of the portable light when the portable light is disposed in the receptacle of the charging device and the latch arms are moved to be farther apart, whereby the latch arms are biased to move into the receptacle to retain the portable light in the charging device.

A portable light having a pivotable light head may comprise: a light body for receiving a source of electrical power; a light head pivotably mounted at a base end thereof to the light body, wherein the light head includes a light source energizable for producing light; one of the light body and the light head having a pair of substantially coaxial and cylindrical projections extending therefrom; the other of the light body and the light head having a pair of substantially coaxial receptacles cooperating with the pair of substantially coaxial and cylindrical projections of the one of the light body and the light head for providing a pivotable joint between the light head and the light body, wherein one or both of the cylindrical projections has a plurality of projections and/or recesses thereon for providing a detent for the pivoting of the light head relative to the light body, whereby the light head tends to remain in a detent position at certain pivot angles relative to the light body when manually moved to such positions; and a switch actuatable for coupling electrical power from the source of electrical power to the light source for energizing the light source. The light body may have a base configured for the portable light being placed on a surface, wherein the light head is pivotably mounted with its base end pivoted near an end of the base of the light body. The portable light having a pivotable light head wherein at least one of the cylindrical projections and at least a corresponding one of the coaxial receptacles each has an opening therethrough, and wherein one or more electrical conductors pass through the openings of the at least one of the cylindrical projections and the corresponding one of the coaxial receptacles for conducting electrical power from the source of electrical power to the light source. The light source of the light head may include: a plurality of light emitting diodes each having an associated reflective element for directing a beam of light from the light emitting diode. The light head may include: a head housing and a heat sink for supporting the light source within the head housing; or a head housing and a heat sink for supporting the light source within the head housing, wherein the head housing may include a forward housing part having an opening that corresponds in shape and location with the light source and a rearward housing part; or a head housing and a heat sink for supporting the light source within the head housing, wherein the head housing may include a forward housing part having an opening that corresponds in shape and location with the light source and a rearward housing part that has a plurality of openings to facilitate cooling of the heat sink therein. The light head may include: a head housing and a heat sink for supporting the light source within the head housing, wherein the substantially coaxial and cylindrical projections extend outwardly from the heat sink through coaxial openings in the head housing. The plurality of projections and/or recesses of the one or both of the cylindrical projections may include a plurality of circumferential teeth thereon for providing the detent. The light head may have a latch projection at an end thereof distal from the base end thereof and wherein the light body may include a latch ring pivotably mounted on the light body at a location whereat the latch ring is pivotable to engage the latch projection of the light head when the light head is pivoted to be adjacent to the light body. The latch ring may be pivotable to a first position whereat it does not engage the latch projection of the light head, whereby the light head is not constrained by the latch ring, and is pivotable to a second position whereat it engages the latch projection of the light head when the light head is pivoted to be adjacent the forward end of the light body, whereby the light head is constrained by the latch ring. The latch ring may be pivotable to a third position whereat it is stowed in a further recess of the light body. The further recess may be configured to have an interference fit with the latch ring thereby to retain the latch ring in the third position. The light body may have a slot or a recess or a slot and a recess, wherein the slot and/or recess is/are configured to receive the latch ring therein when the light head is pivoted away from the light body and the latch ring is pivoted toward the light body. The slot and/or recess may be configured to have an interference fit with the latch ring thereby to retain the latch ring therein. The portable light having a pivotable light head wherein the light body contains a rechargeable battery, the light body having opposing sides and a latching recess of a predetermined shape in a base thereof, and having one or more charging contacts for receiving electrical power for charging the rechargeable battery, the portable light may further comprise a charging device comprising: a charger housing having a receptacle configured to receive the light body of the portable light and having one or more charging contacts configured to make electrical connection to the one or more charging contacts of the portable light when the portable light is disposed in the receptacle of the charger housing; a release latch moveably mounted to the charger housing and having a projection, wherein when the release latch is biased to move toward a first position the projection of the release latch extends into the receptacle of the charger housing for engaging the portable light when the portable light is disposed in the receptacle of the charging device, whereby the portable light is retained in the charging device, and wherein when the release latch is moved to a second position the projection of the release latch does not extend into the receptacle of the charger housing and does not engage the portable light when the portable light is disposed in the receptacle of the charging device, whereby the portable light is released to be removed from the receptacle of the charging device; a pair of latch arms each moveably mounted on the charger housing in opposing positions at opposite sides of the receptacle thereof, the latch arms being biased to move toward each other so as to be closer together and to extend into the receptacle and to be movable farther apart to be out of the receptacle, wherein each latch arm has a distal end configured to engage the light body of the portable light when the portable light is disposed in the receptacle of the charging device and the latch arms are moved to be closer together and to not engage the light body of the portable light when the portable light is disposed in the receptacle of the charging device and the latch arms are moved to be farther apart, whereby the latch arms are biased to move into the receptacle to retain the portable light in the charging device.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." In addition, the term "at least one of" one or more elements is intended to include one of any one of the elements, more than one of any of the elements, and two or more of the elements up to and including all of the elements, and so, e.g., the phrase in the form "at least one of A, B and C" includes "A," "B," "C," "A and B," "A and C," "B and C," and "A and B and C."

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, and adhesive, and the like.

As used herein, the terms "connected" and "coupled" as well as variations thereof are not intended to be exact synonyms, but to encompass some similar things and some different things. The term "connected" may be used generally to refer to elements that have a direct electrical and/or physical contact to each other, whereas the term "coupled" may be used generally to refer to elements that have an indirect electrical and/or physical contact with each other, e.g., via one or more intermediate elements, so as to cooperate and/or interact with each other, and may include elements in direct contact as well.

The term battery is used herein to refer to an electro-chemical device comprising one or more electro-chemical cells and/or fuel cells, and so a battery may include a single cell or plural cells, whether as individual units or as a packaged unit. A battery is one example of a type of an electrical power source suitable for a portable or other device. Such devices could include power sources including, but not limited to, fuel cells, super capacitors, solar cells, and the like. Any of the foregoing may be intended for a single use or for being rechargeable or for both.

Various embodiments of a battery may have one or more battery cells, e.g., one, two, three, four, or five or more battery cells, as may be deemed suitable for any particular device. A battery may employ various types and kinds of battery chemistry types, e.g., a carbon-zinc, alkaline, lead acid, nickel-cadmium (Ni—Cd), nickel-metal-hydride (NiMH) or lithium-ion (Li-Ion) battery type, of a suitable number of cells and cell capacity for providing a desired operating time and/or lifetime for a particular device, and may be intended for a single use or for being rechargeable or for both. Examples may include a three or six cell lead acid battery typically producing about 6 volts or about 12 volts, a three cell Ni—Cd battery typically producing about 3.6 volts, a four cell NiMH battery typically producing about 4.8 volts, a five cell NiMH battery producing about 6 volts, a Li-Ion battery typically producing about 3.5 volts, or a two-cell Li-Ion battery typically producing about 7 volts, it being noted that the voltages produced thereby will be higher when approaching full charge and will be lower in discharge, particularly when providing higher current and when reaching a low level of charge, e.g., becoming discharged.

The term DC converter is used herein to refer to any electronic circuit that receives at an input electrical power at one voltage and current level and provides at an output DC electrical power at a different voltage and/or current level. Examples may include a DC-DC converter, an AC-DC converter, a boost converter, a buck converter, a buck-boost converter, a single-ended primary-inductor converter (SEPIC), a series regulating element, a current level regulator, and the like. The input and output thereof may be DC coupled and/or AC coupled, e.g., as by a transformer and/or capacitor. A DC converter may or may not include circuitry for regulating a voltage and/or a current level, e.g., at an output thereof, and may have one or more outputs providing electrical power at different voltage and/or current levels and/or in different forms, e.g., AC or DC.

While the present invention has been described in terms of the foregoing example embodiments, variations within the scope and spirit of the present invention as defined by the claims following will be apparent to those skilled in the art. For example, light head 200 could be pivotally mounted at its upper end with a latch engaging a latching loop 170 on light housing 110 located at the bottom end thereof, whereby light head 200 is pivotable upward relative to light housing 110 rather than downward as in the illustrated example.

By was of further example, light head 200 could be pivoted about an intermediate location or axis thereon, e.g., so as to be pivotable upwardly, downwardly, or both upwardly and downwardly, relative to light housing 110. In any arrangement, a latching loop 172 and complementary latch feature 217 are provided in suitable locations for latching and releasing light head 200 relative to light housing 110 or portable light 100.

The corresponding electrical contacts 192, 460 of light 100 and charging device 400 may be located on the end of base 120 as illustrated or may be located on one or both of the sides thereof, as may be convenient.

While the illustrated embodiment of light 100 has substantially coaxial and cylindrical projections 320 that extend outwardly from the heat sink 300 of light head 200 and into corresponding substantially coaxial and cylindrical receptacles 152 at the inner sides of the forward ends 122 of base 120, the coaxial and cylindrical projections can extend inwardly from the forward ends 122 of base 120 into the space therebetween and the corresponding coaxial and cylindrical receptacles can be on light head 200, e.g., in heat sink 300 thereof, where they respectively receive the projections extending from ends 122 of base 120.

While latch arms 420 are illustrated as being pivotable on a pivot 424 about an axis that is substantially parallel to the sidewall 432 of receptacle 430 and that is substantially perpendicular to the base surface of receptacle 430 between walls 432, 434 thereof, they can be pivoted about any suitable axis that provides suitable movement of the flanges 422 thereof for admitting light 100 into charger 400 and for releasing light 100 therefrom, substantially as described.

While certain features may be described as a raised feature, e.g., a ridge, boss, flange, projection or other raised feature, such feature may be positively formed or may be what remains after a recessed feature, e.g., a groove, slot, hole, indentation, recess or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A portable light having a pivotable light head comprising:
    a light body for receiving a source of electrical power;
    a light head pivotably mounted at a base end thereof to said light body, wherein said light head includes a light source energizable for producing light;
    said light head having a pair of outwardly extending substantially coaxial and cylindrical projections near the base end thereof;
    said light body having a pair of substantially coaxial receptacles cooperating with the pair of outwardly extending substantially coaxial and cylindrical projections of said light head for providing a pivotable joint between said light head and said light body,
    wherein one or both of the cylindrical projections has a plurality of projections and/or recesses thereon for providing a detent for the pivoting of said light head relative to said light body,
    whereby said light head tends to remain in a detent position at certain pivot angles relative to said light body when manually moved to such positions; and
    a switch actuatable for coupling electrical power from the source of electrical power to said light source for energizing said light source.

2. The portable light having a pivotable light head of claim 1 wherein said light body has a base configured for said portable light being placed on a surface, wherein said light head is pivotably mounted with its base end pivoted near an end of the base of said light body.

3. The portable light having a pivotable light head of claim 2 wherein at least one of the cylindrical projections of said light head and at least a corresponding one of the coaxial receptacles of said light body each has an opening therethrough, and wherein one or more electrical conductors pass through the openings of the at least one of the cylindrical projections and the corresponding one of the coaxial receptacles for conducting electrical power from the source of electrical power to the light source.

4. The portable light having a pivotable light head of claim 1 wherein the light source of said light head includes: a plurality of light emitting diodes each having an associated reflective element for directing a beam of light from the light emitting diode.

5. The portable light having a pivotable light head of claim 1 wherein said light head includes:
 a head housing and a heat sink for supporting the light source within said head housing; or
 a head housing and a heat sink for supporting the light source within said head housing, wherein the head housing includes a forward housing part having an opening that corresponds in shape and location with the light source and a rearward housing part; or
 a head housing and a heat sink for supporting the light source within said head housing, wherein the head housing includes a forward housing part having an opening that corresponds in shape and location with the light source and a rearward housing part that has a plurality of openings to facilitate cooling of the heat sink therein.

6. The portable light having a pivotable light head of claim 1 wherein said light head includes:
 a head housing and a heat sink for supporting the light source within said head housing, wherein the substantially coaxial and cylindrical projections extend outwardly from the heat sink through coaxial openings in the head housing.

7. The portable light having a pivotable light head of claim 1 wherein the plurality of projections and/or recesses of the one or both of the cylindrical projections include a plurality of circumferential teeth thereon for providing the detent.

8. The portable light having a pivotable light head of claim 1 wherein said light head has a latch projection at an end thereof distal from the base end thereof and wherein said light body includes a latch ring pivotably mounted on said light body at a location whereat said latch ring is pivotable to engage the latch projection of said light head when said light head is pivoted to be adjacent to said light body.

9. The portable light having a pivotable light head of claim 8 wherein said latch ring is pivotable to a first position whereat it does not engage the latch projection of said light head, whereby said light head is not constrained by said latch ring, and is pivotable to a second position whereat it engages the latch projection of said light head when said light head is pivoted to be adjacent the forward end of said light body, whereby said light head is constrained by said latch ring.

10. The portable light having a pivotable light head of claim 9 wherein said latch ring is pivotable to a third position whereat it is stowed in a further recess of said light body.

11. The portable light having a pivotable light head of claim 10 wherein the further recess is configured to have an interference fit with said latch ring thereby to retain the latch ring in the third position.

12. The portable light having a pivotable light head of claim 8 wherein said light body has a slot or a recess or a slot and a recess, wherein the slot and/or recess are configured to receive said latch ring therein when said light head is pivoted away from said light body and said latch ring is pivoted toward said light body.

13. The portable light having a pivotable light head of claim 12 wherein the slot and/or recess are configured to have an interference fit with said latch ring thereby to retain the latch ring therein.

14. The portable light having a pivotable light head of claim 1 wherein the light body contains a rechargeable battery, the light body having opposing sides and a latching recess of a predetermined shape in a base thereof, and having one or more charging contacts for receiving electrical power for charging the rechargeable battery,
 the portable light of claim 1 further comprising a charging device comprising:
  a charger housing having a receptacle configured to receive the light body of the portable light and having one or more charging contacts configured to make electrical connection to the one or more charging contacts of the portable light when the portable light is disposed in the receptacle of said charger housing;
  a release latch moveably mounted to said charger housing and having a projection,
  wherein when said release latch is biased to move toward a first position the projection of said release latch extends into the receptacle of the charger housing for engaging the portable light when the portable light is disposed in the receptacle of said charging device, whereby the portable light is retained in said charging device, and
  wherein when said release latch is moved to a second position the projection of said release latch does not extend into the receptacle of the charger housing and does not engage the portable light when the portable light is disposed in the receptacle of said charging device, whereby the portable light is released to be removed from the receptacle of said charging device;
  a pair of latch arms each moveably mounted on said charger housing in opposing positions at opposite sides of the receptacle thereof, said latch arms being biased to move toward each other so as to be closer together and to extend into the receptacle and to be movable farther apart to be out of the receptacle,
  wherein each latch arm has a distal end configured to engage the light body of the portable light when the portable light is disposed in the receptacle of said charging device and the latch arms are moved to be closer together and to not engage the light body of the portable light when the portable light is disposed in the receptacle of said charging device and the latch arms are moved to be farther apart,
  whereby said latch arms are biased to move into the receptacle to retain the portable light in said charging device.

15. A portable light having a pivotable light head comprising:
 a light body for receiving a source of electrical power;
 a light head pivotably mounted at a base end thereof to said light body, wherein said light head includes a light source energizable for producing light;
 one of said light body and said light head having a pair of substantially coaxial and cylindrical projections extending therefrom;

the other of said light body and said light head having a pair of substantially coaxial receptacles cooperating with the pair of substantially coaxial and cylindrical projections of the one of said light body and said light head for providing a pivotable joint between said light head and said light body, wherein one or both of the cylindrical projections has a plurality of projections and/or recesses thereon for providing a detent for the pivoting of said light head relative to said light body, whereby said light head tends to remain in a detent position at certain pivot angles relative to said light body when manually moved to such positions; and a switch actuatable for coupling electrical power from the source of electrical power to said light source for energizing said light source.

16. The portable light having a pivotable light head of claim 15 wherein said light body has a base configured for said portable light being placed on a surface, wherein said light head is pivotably mounted with its base end pivoted near an end of the base of said light body.

17. The portable light having a pivotable light head of claim 16 wherein at least one of the cylindrical projections and at least a corresponding one of the coaxial receptacles each has an opening therethrough, and wherein one or more electrical conductors pass through the openings of the at least one of the cylindrical projections and the corresponding one of the coaxial receptacles for conducting electrical power from the source of electrical power to the light source.

18. The portable light having a pivotable light head of claim 15 wherein the light source of said light head includes: a plurality of light emitting diodes each having an associated reflective element for directing a beam of light from the light emitting diode.

19. The portable light having a pivotable light head of claim 15 wherein said light head includes:
a head housing and a heat sink for supporting the light source within said head housing; or
a head housing and a heat sink for supporting the light source within said head housing, wherein the head housing includes a forward housing part having an opening that corresponds in shape and location with the light source and a rearward housing part; or
a head housing and a heat sink for supporting the light source within said head housing, wherein the head housing includes a forward housing part having an opening that corresponds in shape and location with the light source and a rearward housing part that has a plurality of openings to facilitate cooling of the heat sink therein.

20. The portable light having a pivotable light head of claim 15 wherein said light head includes:
a head housing and a heat sink for supporting the light source within said head housing, wherein the substantially coaxial and cylindrical projections extend outwardly from the heat sink through coaxial openings in the head housing.

21. The portable light having a pivotable light head of claim 15 wherein the plurality of projections and/or recesses of the one or both of the cylindrical projections include a plurality of circumferential teeth thereon for providing the detent.

22. The portable light having a pivotable light head of claim 15 wherein said light head has a latch projection at an end thereof distal from the base end thereof and wherein said light body includes a latch ring pivotably mounted on said light body at a location whereat said latch ring is pivotable to engage the latch projection of said light head when said light head is pivoted to be adjacent to said light body.

23. The portable light having a pivotable light head of claim 22 wherein said latch ring is pivotable to a first position whereat it does not engage the latch projection of said light head, whereby said light head is not constrained by said latch ring, and is pivotable to a second position whereat it engages the latch projection of said light head when said light head is pivoted to be adjacent the forward end of said light body, whereby said light head is constrained by said latch ring.

24. The portable light having a pivotable light head of claim 23 wherein said latch ring is pivotable to a third position whereat it is stowed in a further recess of said light body.

25. The portable light having a pivotable light head of claim 24 wherein the further recess is configured to have an interference fit with said latch ring thereby to retain the latch ring in the third position.

26. The portable light having a pivotable light head of claim 22 wherein said light body has a slot or a recess or a slot and a recess, wherein the slot and/or recess are configured to receive said latch ring therein when said light head is pivoted away from said light body and said latch ring is pivoted toward said light body.

27. The portable light having a pivotable light head of claim 26 wherein the slot and/or recess are configured to have an interference fit with said latch ring thereby to retain the latch ring therein.

28. The portable light having a pivotable light head of claim 15 wherein the light body contains a rechargeable battery, the light body having opposing sides and a latching recess of a predetermined shape in a base thereof, and having one or more charging contacts for receiving electrical power for charging the rechargeable battery, the portable light of claim 15 further comprising a charging device comprising:
a charger housing having a receptacle configured to receive the light body of the portable light and having one or more charging contacts configured to make electrical connection to the one or more charging contacts of the portable light when the portable light is disposed in the receptacle of said charger housing;
a release latch moveably mounted to said charger housing and having a projection,
wherein when said release latch is biased to move toward a first position the projection of said release latch extends into the receptacle of the charger housing for engaging the portable light when the portable light is disposed in the receptacle of said charging device, whereby the portable light is retained in said charging device, and
wherein when said release latch is moved to a second position the projection of said release latch does not extend into the receptacle of the charger housing and does not engage the portable light when the portable light is disposed in the receptacle of said charging device, whereby the portable light is released to be removed from the receptacle of said charging device;
a pair of latch arms each moveably mounted on said charger housing in opposing positions at opposite sides of the receptacle thereof, said latch arms being biased to move toward each other so as to be closer together and to extend into the receptacle and to be movable farther apart to be out of the receptacle, wherein each latch arm has a distal end configured to engage the light body of the portable light when the portable light is disposed in the receptacle of said charging device and the latch arms are moved to be closer together and to not engage the light body of the portable light when the portable light is disposed in the receptacle of said charging device and the latch arms are moved to be farther apart, whereby said latch arms are biased to move into the receptacle to retain the portable light in said charging device.

* * * * *